(12) United States Patent
Miwa

(10) Patent No.: US 7,797,084 B2
(45) Date of Patent: Sep. 14, 2010

(54) BUILDING ENERGY MANAGEMENT SYSTEM

(76) Inventor: Kazuo Miwa, 5-26-2 Omori-nishi, Ota-ku, Tokyo (JP) 143-0015

( * ) Notice: Subject to any disclaimer, the term of this patent is extended or adjusted under 35 U.S.C. 154(b) by 472 days.

(21) Appl. No.: 11/883,884

(22) PCT Filed: Sep. 28, 2005

(86) PCT No.: PCT/JP2005/017884

§ 371 (c)(1),
(2), (4) Date: Aug. 8, 2007

(87) PCT Pub. No.: WO2006/085406

PCT Pub. Date: Aug. 17, 2006

(65) Prior Publication Data

US 2009/0125149 A1    May 14, 2009

(30) Foreign Application Priority Data

Feb. 8, 2005    (JP)    .............................. 2005-032327

(51) Int. Cl.
| | |
|---|---|
| G05D 3/12 | (2006.01) |
| G05D 11/00 | (2006.01) |
| G01R 11/56 | (2006.01) |
| G01R 21/133 | (2006.01) |
| G06F 17/00 | (2006.01) |
| F24F 7/06 | (2006.01) |
| F24F 7/007 | (2006.01) |
| F24F 11/02 | (2006.01) |
| F23N 5/20 | (2006.01) |
| F28F 13/00 | (2006.01) |

(52) U.S. Cl. ....................... 700/296; 700/291; 705/412; 454/229; 236/46 R; 165/267

(58) Field of Classification Search ................... 700/28, 700/32, 286, 291, 295, 296; 702/62; 705/412; 454/229; 307/11, 31, 35, 38, 41; 236/46 R; 165/267

See application file for complete search history.

(56) References Cited

U.S. PATENT DOCUMENTS 3,521,077 A    7/1970    Buenzli, Jr.

(Continued)

FOREIGN PATENT DOCUMENTS

JP    62-225134 A    10/1987

(Continued)

OTHER PUBLICATIONS

Office Communication dated Jun. 6, 2008 (EPO).

(Continued)

*Primary Examiner*—Crystal J Barnes-Bullock
(74) *Attorney, Agent, or Firm*—Rader, Fishman & Grauer PLLC

(57) ABSTRACT

An energy management system for managing energy such as power consumed in a building in an optimal state to significantly save energy is provided. A computer control system (200) for controlling the energy management system performs program control as follows. Current date and time are acquired, a control pattern for that time is obtained using a control program, so as to determine whether operation of an air conditioner (186) is to be turned ON or OFF, and then output either an operation instruction or a stop instruction. A control signal is then output from a digital output unit (212) to the air conditioner (186). Thus, the air conditioner (186) temporarily stops operation according to a predetermined pattern for the program control. The current operating state is displayed on a display unit (240) and a remote monitoring unit (270).

5 Claims, 19 Drawing Sheets

U.S. PATENT DOCUMENTS

| | | | | |
|---|---|---|---|---|
| 3,872,286 A | * | 3/1975 | Putman | 705/412 |
| 4,031,406 A | * | 6/1977 | Leyde et al. | 307/41 |
| 4,060,709 A | * | 11/1977 | Hanson | 219/130.33 |
| 4,153,936 A | * | 5/1979 | Schmitz et al. | 700/296 |
| 4,181,950 A | * | 1/1980 | Carter, II | 700/291 |
| 4,228,364 A | | 10/1980 | Walden | |
| 4,351,028 A | * | 9/1982 | Peddie et al. | 700/286 |
| 4,370,723 A | * | 1/1983 | Huffman et al. | 700/295 |
| 4,419,666 A | * | 12/1983 | Gurr et al. | 379/102.01 |
| 4,477,733 A | * | 10/1984 | Herdeman | 307/35 |
| 4,506,514 A | * | 3/1985 | Lamar et al. | 62/91 |
| 4,549,274 A | * | 10/1985 | Lerner et al. | 700/295 |
| 4,612,619 A | * | 9/1986 | Culp | 700/296 |
| 4,682,473 A | * | 7/1987 | Rogers, III | 62/89 |
| 4,830,757 A | * | 5/1989 | Lynch et al. | 210/742 |
| 5,359,540 A | * | 10/1994 | Ortiz | 700/295 |
| 5,436,510 A | | 7/1995 | Gilbert | |
| 5,539,633 A | * | 7/1996 | Hildebrand et al. | 700/32 |
| 5,572,438 A | * | 11/1996 | Ehlers et al. | 700/295 |
| 6,493,643 B1 | | 12/2002 | Aisa | |
| 6,514,138 B2 | * | 2/2003 | Estepp | 454/229 |
| 6,621,179 B1 | * | 9/2003 | Howard | 307/38 |
| 6,622,925 B2 | * | 9/2003 | Carner et al. | 236/46 R |
| 6,662,866 B1 | * | 12/2003 | Heath | 165/267 |
| 6,799,091 B2 | * | 9/2004 | Bradford | 700/295 |
| 7,043,380 B2 | * | 5/2006 | Rodenberg et al. | 702/62 |
| 2003/0036822 A1 | * | 2/2003 | Davis et al. | 700/295 |
| 2004/0046455 A1 | | 3/2004 | Murguia | |

FOREIGN PATENT DOCUMENTS

| | | | |
|---|---|---|---|
| JP | 10-309037 A | | 11/1998 |
| JP | 11-215700 A | | 8/1999 |
| JP | 2001-289485 A | | 10/2001 |
| JP | 2002139238 A | * | 5/2002 |
| JP | 2003-023729 A | | 1/2003 |
| JP | 2004-116820 A | | 4/2004 |

OTHER PUBLICATIONS

International Search Report Nov. 22, 2005.
Notification of Transmittal of Translation of the International Preliminary Report mailed on Feb. 14, 2008.

* cited by examiner (a)

| | INSTALLED CAPACITY w/h | HOURLY CHANGE IN LOAD VALUE | 9:00 LOAD | 12:00 LOAD | 14:00 LOAD | 16:00 LOAD | MAXIMUM LOAD | AVERAGE LOAD | HEATING LOAD | REQUIRED AIR AMOUNT m³/h |
|---|---|---|---|---|---|---|---|---|---|---|
| AIR CONDITIONING | 3,150 | AIR CONDITIONING LOAD | 2,263 | 2,636 | 2,738 | 2,684 | 2,738 | 2,580 | | INSTALLED CAPACITY 6,650 |
| HEATING | 3,500 | SURPLUS CAPACITY | 887 | 514 | 412 | 466 | 412 | 570 | 3,231 | MAXIMUM LOAD 4,500 |
| | | SURPLUS RATE | 0.28 | 0.16 | 0.13 | 0.15 | 0.13 | 0.18 | 269 | SURPLUS 2,100 |
| | | | | | | | | | 0.08 | SURPLUS RATE 0.32 |

| MONTHLY AIR-CONDITIONING OPERATION COEFFICIENT | MAY | JUNE | JULY | AUGUST | SEPTEMBER | OCTOBER | NOVEMBER | DECEMBER | JANUARY | FEBRUARY | MARCH | APRIL |
|---|---|---|---|---|---|---|---|---|---|---|---|---|
| | 0.52 | 0.63 | 0.71 | 0.82 | 0.73 | 0.45 | 0.41 | 0.41 | 0.92 | 0.59 | 0.30 | 0.32 |

(b)

| TIME | MAY | JUNE | JULY | AUGUST | SEPTEMBER | OCTOBER | NOVEMBER | DECEMBER | JANUARY | FEBRUARY | MARCH | APRIL |
|---|---|---|---|---|---|---|---|---|---|---|---|---|
| 9:00 | 0.30 | 0.30 | 0.32 | 0.28 | 0.30 | 0.30 | 0.30 | 0.27 | 0.10 | 0.17 | 0.30 | 0.30 |
| 12:00 | 0.26 | 0.21 | 0.19 | 0.16 | 0.18 | 0.29 | 0.30 | 0.30 | 0.20 | 0.30 | 0.30 | 0.30 |
| 14:00 | 0.21 | 0.17 | 0.15 | 0.13 | 0.15 | 0.23 | 0.26 | 0.30 | 0.23 | 0.30 | 0.30 | 0.30 |
| 16:00 | 0.23 | 0.19 | 0.17 | 0.15 | 0.17 | 0.27 | 0.29 | 0.30 | 0.20 | 0.20 | 0.30 | 0.30 |
| 17:00 | 0.25 | 0.21 | 0.18 | 0.16 | 0.18 | 0.29 | 0.30 | 0.30 | 0.17 | 0.20 | 0.30 | 0.30 |
| 18:00 | 0.25 | 0.21 | 0.18 | 0.16 | 0.18 | 0.29 | 0.30 | 0.30 | 0.17 | 0.23 | 0.30 | 0.30 |
| 19:00 | 0.28 | 0.23 | 0.21 | 0.18 | 0.20 | 0.30 | 0.30 | 0.30 | 0.20 | 0.23 | 0.30 | 0.30 |
| 20:00 | 0.30 | 0.25 | 0.22 | 0.19 | 0.22 | 0.30 | 0.30 | 0.27 | 0.20 | 0.20 | 0.27 | 0.30 |
| 21:00 | 0.31 | 0.26 | 0.23 | 0.20 | 0.22 | 0.30 | 0.30 | 0.27 | 0.20 | 0.20 | 0.27 | 0.30 |
| 22:00 | 0.30 | 0.26 | 0.23 | 0.20 | 0.23 | 0.30 | 0.30 | 0.27 | 0.20 | 0.20 | 0.27 | 0.30 |

FIG.8

| ITEM NAME | | JULY | AUGUST |
|---|---|---|---|
| | TIME | TEMPERATURE | TEMPERATURE |
| | | | |
| | 9:00 | 26.2 | 29.6 |
| | 12:00 | 29.9 | 34.1 |
| | 14:00 | 31.1 | 34.1 |
| | 16:00 | 26.3 | 33.8 |
| A  HOURLY AVERAGE TEMPERATURE 1 | | 28.4 | 32.9 |
| | | | |
| | 17:00 | 25.6 | 32.8 |
| | 18:00 | 26.1 | 31.9 |
| | 19:00 | 25.3 | 30.4 |
| | 20:00 | 25.1 | 28.3 |
| | 21:00 | 24.8 | 27.8 |
| | 22:00 | 24.6 | 27.1 |
| | 23:00 | 24.3 | 26.4 |
| | 24:00 | 24.1 | 25.8 |
| | 1:00 | 20.5 | 23.6 |
| | 2:00 | 20.5 | 23.2 |
| | 3:00 | 20.9 | 22.9 |
| | 4:00 | 20.5 | 22.6 |
| | 5:00 | 20.5 | 22.5 |
| | 6:00 | 20.9 | 22.1 |
| | 7:00 | 22.6 | 24.4 |
| | 8:00 | 23.5 | 27.5 |
| B  HOURLY AVERAGE TEMPERATURE 2 | | 23.1 | 26.2 |
| C  24-HOUR AVERAGE TEMPERATURE | | 25.74 | 29.55 |
| D  TEMPERATURE CHANGE COEFFICIENT | | 0.87 | 1.00 |
| E  MONTHLY AIR-CONDITIONING OPERATION COEFFICIENT | | 0.71 | 0.82 |

MONTH/TIME SCHEDULE PATTERN SELECTION

JANUARY

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| PATTERN | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| PATTERN | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 |

FEBRUARY

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| PATTERN | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| PATTERN | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 | 21 |

MARCH

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| PATTERN | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| PATTERN | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |

APRIL

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| PATTERN | 26 | 26 | 26 | 26 | 26 | 26 | 26 | 26 | 26 | 26 | 26 | 26 | 26 | 26 | 26 | 26 | 26 | 26 | 26 | 26 | 26 | 26 | 26 | 26 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| PATTERN | 24 | 24 | 24 | 24 | 24 | 25 | 25 | 26 | 26 | 26 | 26 | 26 | 26 | 26 | 26 | 26 | 26 | 26 | 26 | 26 | 26 | 26 | 26 | 26 |

MAY

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| PATTERN | 3 | 3 | 3 | 3 | 3 | 3 | 3 | 3 | 3 | 3 | 3 | 3 | 3 | 3 | 3 | 3 | 3 | 3 | 3 | 1 | 1 | 1 | 1 | 1 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| PATTERN | 2 | 2 | 2 | 2 | 3 | 3 | 3 | 3 | 3 | 3 | 3 | 3 | 3 | 3 | 3 | 3 | 3 | 3 | 3 | 3 | 3 | 3 | 3 | 3 |

JUNE

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| PATTERN | 27 | 27 | 27 | 27 | 27 | 27 | 27 | 27 | 27 | 27 | 27 | 27 | 27 | 27 | 27 | 27 | 27 | 27 | 4 | 4 | 4 | 4 | 4 | 4 |

FIG. 12

INV SCHEDULE SETTING

PATTERN 1

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| OUTPUT(%) | 60 | 60 | 60 | 60 | 60 | 60 | 60 | 60 | 60 | 60 | 60 | 60 | 60 | 60 | 60 | 60 | 75 | 75 | 75 | 75 | 75 | 75 | 80 | 80 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| OUTPUT(%) | 80 | 80 | 80 | 85 | 85 | 85 | 80 | 80 | 80 | 80 | 80 | 75 | 75 | 75 | 75 | 60 | 60 | 60 | 60 | 60 | 60 | 60 | 60 | 60 |

PATTERN 2

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| OUTPUT(%) | 60 | 60 | 60 | 60 | 60 | 60 | 60 | 60 | 60 | 60 | 60 | 60 | 60 | 60 | 60 | 60 | 60 | 60 | 60 | 60 | 60 | 60 | 60 | 60 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| OUTPUT(%) | 60 | 60 | 60 | 60 | 60 | 60 | 60 | 60 | 60 | 60 | 60 | 60 | 60 | 60 | 60 | 60 | 60 | 60 | 60 | 60 | 60 | 60 | 60 | 60 |

PATTERN 3

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| OUTPUT(%) | 60 | 60 | 60 | 60 | 60 | 60 | 60 | 60 | 60 | 60 | 62 | 60 | 65 | 65 | 65 | 70 | 70 | 75 | 75 | 75 | 80 | 80 | 80 | 80 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| OUTPUT(%) | 80 | 80 | 80 | 80 | 80 | 85 | 85 | 85 | 85 | 85 | 85 | 85 | 80 | 80 | 80 | 80 | 75 | 75 | 75 | 60 | 60 | 60 | 60 | 60 |

PATTERN 4

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| OUTPUT(%) | 75 | 75 | 75 | 80 | 80 | 80 | 80 | 80 | 80 | 80 | 80 | 75 | 75 | 75 | 75 | 70 | 70 | 70 | 70 | 70 | 70 | 70 | 75 | 75 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| OUTPUT(%) | 80 | 80 | 80 | 80 | 80 | 80 | 80 | 80 | 80 | 80 | 80 | 80 | 80 | 80 | 80 | 80 | 60 | 60 | 60 | 60 | 60 | 60 | 60 | 60 |

PATTERN 5

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| OUTPUT(%) | 85 | 90 | 90 | 90 | 95 | 95 | 95 | 95 | 90 | 90 | 85 | 85 | 80 | 80 | 75 | 75 | 70 | 70 | 70 | 70 | 70 | 70 | 75 | 75 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| OUTPUT(%) | 85 | 85 | 85 | 85 | 85 | 90 | 90 | 90 | 90 | 85 | 85 | 85 | 85 | 80 | 80 | 80 | 80 | 75 | 75 | 70 | 60 | 60 | 60 | 60 |

PATTERN 6

| HOUR | 0:00 | 0:30 | 1:00 | 1:30 | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|---|---|---|---|---|---|---|---|---|---|---|---|
| OUTPUT(%) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| HOUR | 12:00 | 12:30 | 13:00 | 13:30 | 14:00 | 14:30 | 15:00 | 15:30 | 16:00 | 16:30 | 17:00 | 17:30 | 18:00 | 18:30 | 19:00 | 19:30 | 20:00 | 20:30 | 21:00 | 21:30 | 22:00 | 22:30 | 23:00 | 23:30 |
| OUTPUT(%) | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG.13

YEARLY SCHEDULE PATTERN

| DEVICE NAME | JANUARY | FEBRUARY | MARCH | APRIL | MAY | JUNE | JULY | AUGUST | SEPTEMBER | OCTOBER | NOVEMBER | DECEMBER |
|---|---|---|---|---|---|---|---|---|---|---|---|---|
| EXHAUST FAN | 2 | 2 | 2 | 1 | 1 | 1 | 1 | 1 | 1 | 2 | 2 | 2 |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

FIG.14

SCHEDULE/ON-DEMAND CONTROL CANCEL

| DEVICE NAME | INPUT SOURCE | UPPER SWITCHING POINT FOR AIR CONDITIONING (°C) | NORMAL TEMPERATURE FOR AIR CONDITIONING (°C) | LOWER SWITCHING POINT FOR HEATING (°C) | NORMAL TEMPERATURE FOR HEATING (°C) |
|---|---|---|---|---|---|
| AIR CONDITIONER SERIES NO.1 | ROOM NO.1 ▽ | 26.0 | 25.0 | 15.0 | 20.0 |
| AIR CONDITIONER SERIES NO.2 | ROOM NO.1 ▽ | 26.0 | 25.0 | 15.0 | 20.0 |
| AIR CONDITIONER SERIES NO.3 | ROOM NO.1 ▽ | 26.0 | 25.0 | 15.0 | 20.0 |
| AIR CONDITIONER SERIES NO.4 | ROOM NO.1 ▽ | 26.0 | 25.0 | 15.0 | 20.0 |
| AIR CONDITIONER SERIES NO.5 | ROOM NO.1 ▽ | 26.0 | 25.0 | 15.0 | 20.0 |
| AIR CONDITIONER SERIES NO.6 | ROOM NO.1 ▽ | 26.0 | 25.0 | 15.0 | 20.0 |
| AIR CONDITIONER SERIES NO.7 | NONE ▽ | | | | |
| AIR CONDITIONER SERIES NO.8 | NONE ▽ | | | | |
| AIR CONDITIONER SERIES NO.9 | NONE ▽ | | | | |
| AIR CONDITIONER SERIES NO.10 | ROOM NO.2 ▽ | 30.0 | 26.0 | 15.0 | 20.0 |
| AIR CONDITIONER SERIES NO.11 | ROOM NO.2 ▽ | 30.0 | 26.0 | 15.0 | 20.0 |
| AIR CONDITIONER SERIES NO.12 | ROOM NO.2 ▽ | 30.0 | 26.0 | 15.0 | 20.0 |
| AIR CONDITIONER SERIES NO.13 | ROOM NO.2 ▽ | 30.0 | 26.0 | 15.0 | 20.0 |
| AIR CONDITIONER SERIES NO.14 | ROOM NO.3 ▽ | 26.5 | 25.5 | 15.0 | 20.0 |
| AIR CONDITIONER SERIES NO.15 | ROOM NO.3 ▽ | 26.5 | 25.5 | 15.0 | 20.0 |
| AIR CONDITIONER SERIES NO.16 | ROOM NO.3 ▽ | 26.5 | 25.5 | 15.0 | 20.0 |

ONE YEAR MONTHLY WEATHER TRANSITION TABLE
TEMPERATURES ARE AVERAGE VALUES   REGION: TOKYO (a)

| PERIOD, TIME | | JANUARY | | | FEBRUARY | | | MARCH | | | APRIL | | | MAY | | | JUNE | | |
|---|---|---|---|---|---|---|---|---|---|---|---|---|---|---|---|---|---|---|---|
| | | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA |
| | 0:00 | -1.9 | - | - | 1.2 | - | - | 5.5 | 76.5 | 16.3 | 11.5 | 76.5 | 27.8 | 13.3 | 76.5 | 31.7 | 19.3 | 78.0 | 47.1 |
| | 2:00 | -1.3 | - | - | -1.0 | - | - | 2.0 | 79.0 | 10.6 | 8.4 | 79.0 | 22.0 | 13.7 | 79.0 | 33.2 | 15.9 | 79.5 | 38.6 |
| | 4:00 | 0.4 | - | - | -1.6 | - | - | 1.7 | 83.0 | 10.6 | 7.7 | 83.0 | 21.3 | 13.6 | 83.0 | 34.0 | 15.6 | 81.5 | 38.4 |
| | 6:00 | -2.6 | - | - | -1.8 | - | - | 1.4 | 84.5 | 10.2 | 7.6 | 84.5 | 21.4 | 13.7 | 84.5 | 34.6 | 16.9 | 81.5 | 41.8 |
| BEGINNING OF MONTH (1ST TO 10TH) | 9:00 | 4.1 | 36.0 | 8.7 | 3.9 | 36.0 | 8.4 | 4.9 | 71.4 | 14.5 | 12.6 | 71.4 | 29.0 | 15.8 | 71.4 | 36.0 | 20.8 | 66.3 | 46.7 |
| | 12:00 | 9.0 | 27.5 | 13.9 | 7.8 | 27.5 | 12.3 | 8.8 | 60.3 | 19.5 | 16.7 | 60.3 | 34.8 | 18.6 | 60.3 | 39.1 | 23.1 | 59.0 | 49.7 |
| | 14:00 | 9.8 | 27.5 | 15.0 | 8.6 | 27.5 | 13.4 | 9.7 | 59.0 | 20.8 | 17.9 | 59.0 | 37.0 | 19.9 | 59.0 | 41.7 | 23.4 | 57.0 | 49.6 |
| | 16:00 | 8.9 | 27.5 | 13.8 | 7.9 | 27.5 | 12.5 | 8.9 | 61.5 | 19.9 | 17.3 | 61.5 | 36.5 | 19.8 | 61.5 | 42.3 | 23.4 | 60.0 | 51.0 |
| | 18:00 | 6.5 | - | - | 6.8 | - | - | 8.8 | 68.0 | 20.8 | 18.2 | 68.0 | 40.7 | 17.1 | 68.0 | 38.1 | 23.2 | 66.5 | 53.4 |
| | 20:00 | 4.4 | - | - | 4.6 | - | - | 7.7 | 72.5 | 19.6 | 16.0 | 72.5 | 36.8 | 15.0 | 72.5 | 34.5 | 21.7 | 72.0 | 51.5 |
| | 22:00 | 2.9 | - | - | 3.2 | - | - | 7.1 | 75.5 | 19.0 | 13.9 | 75.5 | 32.8 | 14.1 | 75.5 | 33.2 | 20.1 | 76.0 | 48.6 |
| AVERAGE | | 3.7 | | | 3.6 | | | 6.1 | 71.9 | 16.5 | 13.4 | 71.9 | 30.9 | 15.9 | 71.9 | 36.2 | 20.3 | 70.7 | 46.9 |

(b)

| PERIOD, TIME | | JULY | | | AUGUST | | | SEPTEMBER | | | OCTOBER | | | NOVEMBER | | | DECEMBER | | |
|---|---|---|---|---|---|---|---|---|---|---|---|---|---|---|---|---|---|---|---|
| | | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA |
| | 0:00 | 23.3 | 78.0 | 59.1 | 25.7 | 78.0 | 67.2 | 23.2 | 76.5 | 58.0 | 15.8 | 76.5 | 37.5 | 13.9 | 76.5 | 33.0 | 5.4 | - | - |
| | 2:00 | 22.5 | 79.5 | 57.2 | 24.8 | 79.5 | 64.8 | 21.3 | 79.0 | 53.3 | 15.9 | 79.0 | 38.5 | 12.3 | 79.0 | 30.1 | 6.4 | - | - |
| | 4:00 | 22.0 | 81.5 | 56.5 | 24.2 | 81.5 | 63.8 | 20.7 | 83.0 | 53.0 | 15.3 | 83.0 | 38.1 | 11.9 | 83.0 | 30.1 | 6.2 | - | - |
| | 6:00 | 22.7 | 81.5 | 58.7 | 24.2 | 81.5 | 63.8 | 20.7 | 84.5 | 53.6 | 15.0 | 84.5 | 37.8 | 11.5 | 84.5 | 29.5 | 5.2 | - | - |
| BEGINNING OF MONTH (1ST TO 10TH) | 9:00 | 28.0 | 66.3 | 68.4 | 28.4 | 66.3 | 69.8 | 25.4 | 71.4 | 62.6 | 18.2 | 71.4 | 41.9 | 15.9 | 71.4 | 36.3 | 9.5 | 36.0 | 16.2 |
| | 12:00 | 30.7 | 59.0 | 72.9 | 31.0 | 59.0 | 73.9 | 27.7 | 60.3 | 63.7 | 20.4 | 60.3 | 43.4 | 19.4 | 60.3 | 40.9 | 14.0 | 27.5 | 20.9 |
| | 14:00 | 30.8 | 57.0 | 71.8 | 31.2 | 57.0 | 73.1 | 28.5 | 59.0 | 65.5 | 20.7 | 59.0 | 43.6 | 20.6 | 59.0 | 43.3 | 15.1 | 27.5 | 22.5 |
| | 16:00 | 30.2 | 60.0 | 71.9 | 30.0 | 60.0 | 71.2 | 27.5 | 61.5 | 63.8 | 19.8 | 61.5 | 42.3 | 19.9 | 61.5 | 42.6 | 13.4 | 27.5 | 20.1 |
| | 18:00 | 28.4 | 66.5 | 63.2 | 28.8 | 66.5 | 71.4 | 25.3 | 68.0 | 60.5 | 18.3 | 68.0 | 41.0 | 16.7 | 68.0 | 37.1 | 9.6 | - | - |
| | 20:00 | 25.2 | 72.0 | 62.3 | 27.2 | 72.0 | 69.1 | 23.9 | 72.5 | 58.4 | 16.7 | 72.5 | 38.5 | 14.7 | 72.5 | 33.8 | 7.3 | - | - |
| | 22:00 | 23.8 | 76.0 | 59.7 | 26.1 | 76.0 | 67.5 | 23.7 | 75.5 | 59.2 | 16.1 | 75.5 | 37.9 | 13.7 | 75.5 | 32.3 | 5.9 | - | - |
| AVERAGE | | 26.0 | 70.7 | 63.8 | 27.4 | 70.7 | 68.7 | 24.4 | 71.9 | 59.2 | 17.5 | 71.9 | 40.0 | 15.5 | 71.9 | 35.4 | 8.9 | 10.8 | 7.2 |

| PERIOD, TIME | | JANUARY | | | FEBRUARY | | | MARCH | | | APRIL | | | MAY | | | JUNE | | |
|---|---|---|---|---|---|---|---|---|---|---|---|---|---|---|---|---|---|---|---|
| | | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA |
| MIDDLE OF MONTH (11TH TO 20TH) | 0:00 | -0.1 | - | - | 3.4 | - | - | 7.0 | 76.5 | 19.0 | 13.8 | 76.5 | 32.8 | 16.1 | 76.5 | 38.2 | 19.7 | 78.0 | 48.2 |
| | 2:00 | -1.8 | - | - | 3.8 | - | - | 8.6 | 79.0 | 22.4 | 11.4 | 79.0 | 28.1 | 16.3 | 79.0 | 39.5 | 20.3 | 79.5 | 50.5 |
| | 4:00 | -1.6 | - | - | 1.8 | - | - | 8.6 | 83.0 | 23.1 | 10.8 | 83.0 | 27.7 | 15.7 | 83.0 | 39.1 | 19.8 | 81.5 | 49.8 |
| | 6:00 | -2.8 | - | - | 1.7 | - | - | 7.6 | 84.5 | 21.4 | 11.1 | 84.5 | 28.6 | 15.7 | 84.5 | 39.5 | 20.7 | 81.5 | 52.4 |
| | 9:00 | 1.8 | 36.0 | 5.4 | 5.5 | 36.0 | 10.6 | 10.9 | 71.4 | 25.5 | 16.6 | 71.4 | 37.9 | 19.9 | 71.4 | 46.3 | 23.3 | 66.3 | 53.6 |
| | 12:00 | 5.8 | 27.5 | 9.8 | 10.4 | 27.5 | 15.8 | 13.5 | 60.3 | 28.2 | 20.5 | 60.3 | 43.6 | 22.3 | 60.3 | 48.2 | 26.8 | 59.0 | 60.2 |
| | 14:00 | 7.3 | 27.5 | 11.7 | 12.0 | 27.5 | 18.1 | 13.7 | 59.0 | 28.2 | 20.7 | 59.0 | 43.6 | 22.7 | 59.0 | 48.6 | 26.6 | 57.0 | 58.4 |
| | 16:00 | 6.3 | 27.5 | 10.4 | 11.3 | 27.5 | 17.1 | 13.4 | 61.5 | 28.3 | 20.1 | 61.5 | 43.1 | 21.9 | 61.5 | 47.6 | 25.8 | 60.0 | 57.8 |
| | 18:00 | 5.2 | - | - | 7.7 | - | - | 11.7 | 68.0 | 26.4 | 19.4 | 68.0 | 43.7 | 18.0 | 68.0 | 40.2 | 22.4 | 66.5 | 51.1 |
| | 20:00 | 1.7 | - | - | 6.0 | - | - | 9.8 | 72.5 | 23.6 | 18.0 | 72.5 | 41.7 | 17.3 | 72.5 | 40.0 | 20.8 | 72.0 | 48.5 |
| | 22:00 | 0.3 | - | - | 4.6 | - | - | 8.8 | 75.5 | 22.2 | 15.4 | 75.5 | 36.3 | 16.7 | 75.5 | 39.4 | 20.0 | 76.0 | 48.3 |
| AVERAGE | | 2.0 | 10.8 | 3.4 | 6.2 | 10.8 | 5.6 | 10.3 | 71.9 | 24.4 | 16.2 | 71.9 | 37.0 | 18.4 | 71.9 | 42.4 | 22.4 | 70.7 | 52.6 |

(b)

| PERIOD, TIME | | JULY | | | AUGUST | | | SEPTEMBER | | | OCTOBER | | | NOVEMBER | | | DECEMBER | | |
|---|---|---|---|---|---|---|---|---|---|---|---|---|---|---|---|---|---|---|---|
| | | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA | TEMPERATURE °C | HUMIDITY %RH | SPECIFIC ENTHALPY kj/kgDA |
| MIDDLE OF MONTH (11TH TO 20TH) | 0:00 | 23.8 | 78.0 | 60.7 | 21.8 | 78.0 | 54.4 | 20.9 | 76.5 | 51.1 | 14.7 | 76.5 | 34.9 | 11.3 | 76.5 | 27.4 | 7.5 | - | - |
| | 2:00 | 23.7 | 79.5 | 61.1 | 26.7 | 79.5 | 71.7 | 20.0 | 79.0 | 49.4 | 14.2 | 79.0 | 34.4 | 11.4 | 79.0 | 28.1 | 6.4 | - | - |
| | 4:00 | 22.8 | 81.5 | 59.0 | 26.2 | 81.5 | 71.0 | 19.1 | 83.0 | 48.3 | 14.5 | 83.0 | 36.1 | 11.2 | 83.0 | 28.5 | 5.6 | - | - |
| | 6:00 | 23.5 | 81.5 | 61.4 | 24.5 | 81.5 | 64.8 | 19.5 | 84.5 | 50.0 | 14.4 | 84.5 | 36.3 | 10.8 | 84.5 | 28.0 | 5.5 | - | - |
| | 9:00 | 28.8 | 66.3 | 71.2 | 28.0 | 66.3 | 68.4 | 24.2 | 71.4 | 58.8 | 16.3 | 71.4 | 37.2 | 12.7 | 71.4 | 29.2 | 7.9 | 36.0 | 13.9 |
| | 12:00 | 31.3 | 59.0 | 75.0 | 30.3 | 59.0 | 71.5 | 27.8 | 60.3 | 64.1 | 18.3 | 60.3 | 38.4 | 14.9 | 60.3 | 31.0 | 11.8 | 27.5 | 17.8 |
| | 14:00 | 31.7 | 57.0 | 74.9 | 31.0 | 57.0 | 72.4 | 28.2 | 59.0 | 64.5 | 18.5 | 59.0 | 38.4 | 15.6 | 59.0 | 32.1 | 12.5 | 27.5 | 18.8 |
| | 16:00 | 30.9 | 60.0 | 74.3 | 29.9 | 60.0 | 70.8 | 27.5 | 61.5 | 63.8 | 18.0 | 61.5 | 38.1 | 15.2 | 61.5 | 31.9 | 11.7 | 27.5 | 17.6 |
| | 18:00 | 28.6 | 66.5 | 70.7 | 25.7 | 66.5 | 61.0 | 24.3 | 68.0 | 57.4 | 15.8 | 68.0 | 35.1 | 13.8 | 68.0 | 30.7 | 10.5 | - | - |
| | 20:00 | 26.7 | 72.0 | 67.4 | 24.0 | 72.0 | 58.4 | 22.9 | 72.5 | 55.3 | 15.3 | 72.5 | 35.2 | 12.9 | 72.5 | 29.9 | 9.1 | - | - |
| | 22:00 | 24.9 | 76.0 | 63.4 | 23.3 | 76.0 | 58.1 | 21.9 | 75.5 | 53.6 | 15.0 | 75.5 | 35.3 | 11.6 | 75.5 | 27.8 | 8.3 | - | - |
| AVERAGE | | 27.0 | 70.7 | 67.2 | 26.5 | 70.7 | 65.7 | 23.3 | 71.9 | 56.0 | 15.9 | 71.9 | 36.3 | 12.9 | 71.9 | 29.5 | 8.8 | 10.8 | 6.2 |

(a)

| PERIOD, TIME | | JANUARY | | | FEBRUARY | | | MARCH | | | APRIL | | | MAY | | | JUNE | | |
|---|---|---|---|---|---|---|---|---|---|---|---|---|---|---|---|---|---|---|---|
| | | TEMPERATURE °C | HUMIDITY %RH | SPECIFIC ENTHALPY kj/kgDA | °C | %RH | kj/kgDA | °C | %RH | kj/kgDA | °C | %RH | kj/kgDA | °C | %RH | kj/kgDA | °C | %RH | kj/kgDA |
| | 0:00 | 0.3 | - | - | - | - | - | 5.0 | 76.5 | 15.4 | 14.0 | 76.5 | 33.3 | 16.3 | 76.5 | 38.7 | 23.7 | 78.0 | 60.4 |
| | 2:00 | 0.3 | - | - | - | - | - | 8.3 | 79.0 | 21.8 | 11.0 | 79.0 | 27.3 | 17.7 | 79.0 | 43.1 | 24.1 | 79.5 | 62.4 |
| | 4:00 | -0.8 | - | - | 4.2 | - | - | 7.7 | 83.0 | 21.3 | 8.7 | 83.0 | 23.3 | 16.9 | 83.0 | 49.8 | 23.5 | 81.5 | 61.4 |
| | 6:00 | -1.4 | - | - | 2.6 | - | - | 7.0 | 84.5 | 20.2 | 9.2 | 84.5 | 24.6 | 17.9 | 84.5 | 45.4 | 23.7 | 81.5 | 62.0 |
| END OF MONTH (21ST THROUGH 31ST) | 9:00 | 3.2 | 36.0 | 7.5 | 9.7 | 36.0 | 16.5 | 9.7 | 71.4 | 23.2 | 17.9 | 71.4 | 41.1 | 21.0 | 71.4 | 49.3 | 25.3 | 66.3 | 59.6 |
| | 12:00 | 7.8 | 27.5 | 12.3 | 12.6 | 27.5 | 18.9 | 12.6 | 60.3 | 26.4 | 21.1 | 60.3 | 45.1 | 24.7 | 60.3 | 54.7 | 27.6 | 59.0 | 62.6 |
| | 14:00 | 8.7 | 27.5 | 13.5 | 13.0 | 27.5 | 19.5 | 13.0 | 59.0 | 26.9 | 21.4 | 59.0 | 45.3 | 24.6 | 59.0 | 53.8 | 28.7 | 57.0 | 64.8 |
| | 16:00 | 7.9 | 27.5 | 12.5 | 12.3 | 27.5 | 18.5 | 12.3 | 61.5 | 26.1 | 20.1 | 61.5 | 43.1 | 23.3 | 61.5 | 51.4 | 28.7 | 60.0 | 66.8 |
| | 18:00 | 5.3 | - | - | 13.4 | - | - | 8.5 | 68.0 | 20.3 | 19.9 | 68.0 | 45.0 | 21.4 | 68.0 | 49.0 | 26.2 | 66.5 | 62.6 |
| | 20:00 | 2.7 | - | - | 9.7 | - | - | 6.9 | 72.5 | 18.1 | 17.8 | 72.5 | 41.2 | 18.8 | 72.5 | 43.8 | 25.3 | 72.0 | 62.6 |
| | 22:00 | 1.6 | - | - | 7.6 | - | - | 6.6 | 75.5 | 18.1 | 14.5 | 75.5 | 34.2 | 17.4 | 75.5 | 41.2 | 24.4 | 76.0 | 61.7 |
| AVERAGE | | 3.2 | 10.8 | 4.2 | 8.5 | 10.8 | 6.7 | 8.9 | 71.9 | 21.6 | 16.0 | 71.9 | 36.7 | 20.0 | 71.9 | 47.3 | 25.6 | 70.7 | 62.4 |

(b)

| PERIOD, TIME | | JULY | | | AUGUST | | | SEPTEMBER | | | OCTOBER | | | NOVEMBER | | | DECEMBER | | |
|---|---|---|---|---|---|---|---|---|---|---|---|---|---|---|---|---|---|---|---|
| | | TEMPERATURE °C | HUMIDITY %RH | SPECIFIC ENTHALPY kj/kgDA | °C | %RH | kj/kgDA | °C | %RH | kj/kgDA | °C | %RH | kj/kgDA | °C | %RH | kj/kgDA | °C | %RH | kj/kgDA |
| | 0:00 | 24.3 | 78.0 | 62.4 | 22.8 | 78.0 | 57.5 | 21.3 | 76.5 | 52.2 | 14.9 | 76.5 | 35.4 | 7.5 | 76.5 | 19.9 | 2.2 | - | - |
| | 2:00 | 25.1 | 79.5 | 65.9 | 23.0 | 79.5 | 58.8 | 22.2 | 79.0 | 56.0 | 14.2 | 79.0 | 34.4 | 7.2 | 79.0 | 19.7 | 3.2 | - | - |
| | 4:00 | 24.9 | 81.5 | 66.2 | 22.7 | 81.5 | 58.7 | 21.6 | 83.0 | 55.8 | 14.3 | 83.0 | 35.6 | 6.2 | 83.0 | 18.5 | 2.6 | - | - |
| | 6:00 | 25.3 | 81.5 | 67.6 | 22.5 | 81.5 | 58.1 | 22.5 | 84.5 | 59.4 | 14.2 | 84.5 | 35.8 | 5.9 | 84.5 | 18.1 | 2.4 | - | - |
| END OF MONTH (21ST THROUGH 31ST) | 9:00 | 28.3 | 66.3 | 69.5 | 23.4 | 66.3 | 53.9 | 22.3 | 71.4 | 53.0 | 13.9 | 71.4 | 31.8 | 11.3 | 71.4 | 26.3 | 3.6 | 36.0 | 8.0 |
| | 12:00 | 31.1 | 59.0 | 75.0 | 25.5 | 59.0 | 56.3 | 24.7 | 60.3 | 54.7 | 16.7 | 60.3 | 34.8 | 15.7 | 60.3 | 32.7 | 7.7 | 27.5 | 12.2 |
| | 14:00 | 30.6 | 57.0 | 71.1 | 26.4 | 57.0 | 57.9 | 24.7 | 59.0 | 54.1 | 17.4 | 59.0 | 35.9 | 16.4 | 59.0 | 33.8 | 8.0 | 27.5 | 12.6 |
| | 16:00 | 29.7 | 60.0 | 70.1 | 25.9 | 60.0 | 58.1 | 23.6 | 61.5 | 52.2 | 16.9 | 61.5 | 35.6 | 15.1 | 61.5 | 31.7 | 7.4 | 27.5 | 11.8 |
| | 18:00 | 26.8 | 66.5 | 64.5 | 27.9 | 66.5 | 68.2 | 24.7 | 68.0 | 58.6 | 17.7 | 68.0 | 39.5 | 10.9 | 68.0 | 24.8 | 5.8 | - | - |
| | 20:00 | 26.1 | 72.0 | 65.3 | 25.7 | 72.0 | 63.9 | 24.0 | 72.5 | 58.7 | 16.3 | 72.5 | 37.5 | 8.8 | 72.5 | 21.6 | 3.7 | - | - |
| | 22:00 | 24.9 | 76.0 | 63.4 | 24.1 | 76.0 | 60.7 | 22.1 | 75.5 | 54.2 | 15.7 | 75.5 | 37.0 | 8.2 | 75.5 | 21.0 | 2.8 | - | - |
| AVERAGE | | 27.0 | 70.7 | 67.4 | 24.5 | 70.7 | 59.3 | 23.1 | 71.9 | 55.4 | 15.7 | 71.9 | 35.8 | 10.3 | 71.9 | 24.4 | 4.5 | 10.8 | 4.1 |

FIG.17-3

BUILDING ENERGY MANAGEMENT SYSTEM

This is a 371 application of PCT/JP05/17884 filed on Sep. 28, 2005, the entire contents being incorporated by reference. The present application claims priority based on Japanese Patent Application No. 2005-032327, filed Feb. 8, 2005, the entirety of which being incorporated herein by reference.

TECHNICAL FIELD

The present invention relates to a computer-controlled energy management system for managing energy, such as electric power consumed in a building, in an optimal state while significantly saving energy.

BACKGROUND ART

Conventionally, a variety of systems for controlling power supplied to a building or the like have been proposed. However, according to these systems, when a power customer establishes a power reception/distribution facility and receives power supply therefrom, a supply contract is often made between the customer and a power company based on power supply terms and conditions, and controlling the contracted power under that contract. "Energy-saving Control Unit and Energy-saving System" (see Patent Document 1) proposed by the inventors of the present invention is one of them. The present invention is created to reduce power consumption so that it does not exceed a maximum preset demand value, thereby reducing contracted power. This is attained by controlling power supply to power consuming devices, such as air conditioners, refrigeration equipment, motor equipment, and electric light facilities, in a given order of each device (namely, ranked) using a maximum demand wattmeter as a contracted power monitoring gauge and by scheduling and cutting peak demand without any impact on business of large-scale retail stores.

Currently, an electronic ballast, an inverter, and related devices are introduced to each of electrical facilities in a building, and an air-conditioning heat source, control of number of pumps, and a sensor and inverter control are introduced to mechanical facilities, promoting steady energy saving. However, it is not an integrated control system appropriate for an entire building, which controls excessive operation for each room, each floor, or the entire building for seasons, periods, or days, and it operates based on the maximum amount of consumed energy. Therefore, it is difficult to achieve sufficient energy saving.

[Patent Document 1] Japanese Unexamined Patent Application Publication No. 2003-23729.

DISCLOSURE OF INVENTION

Problem to be Solved by the Invention

An objective of the present invention is to provide a computer-controlled energy management system for saving energy in a building by managing energy, such as electric power consumed in the building, in an optimal state and thereby significantly saving energy.

Means of Solving the Problem

In order to achieve the abovementioned objective, the present invention is an energy management system for managing consumed energy of a control target device including air conditioners in a building. The energy management system is characterized in that it includes: a demand estimation means, which receives a signal indicating used power of the building and estimates used power for every predetermined time; a demand warning generation means, which receives the demand estimation and then generates a warning; and a digital control means, which turns the control target device on and off by a preset program such that surplus load for each predetermined time is reduced.

It is preferable that the digital control means reads out and controls a stored, current time on and off pattern according to a program specifying a plurality of on and off patterns for every predetermined time. Furthermore, predetermined off times for respective units of control over the control target device may differ from one another.

It is preferable to further include an analog control means, which controls an output rate for the control target device every predetermined time during rated operation according to a preset program so as to reduce surplus load. It may further include a temperature monitoring means, which monitors a preset temperature, wherein the temperature monitoring means stops control performed according to the program when a temperature that exceeds or falls below the preset temperature is detected.

In addition, a temperature/humidity measuring means, which measures atmospheric temperature and humidity, a specific enthalpy calculation means, which calculates specific enthalpy based on the atmospheric temperature and humidity from the temperature/humidity measuring means, and a correction means, which compares the calculated specific enthalpy and specific enthalpy for preset months and times when air conditioning, so as to correct the program more appropriately may be included so as to control using an optimal corrected program.

The correction means may compare the temperature measured by the temperature/humidity measuring means and preset monthly and hourly temperatures when heating so as to correct the program more appropriately.

EFFECTS OF INVENTION

The above-mentioned energy management system is a system for controlling surplus energy considerably through examination of surplus energy by calculating capacity of respective devices of existing electrical facilities and mechanical facilities and required energy quantity for an entire building, control each device within the electrical facilities and mechanical facilities, and conduct necessary and optimum year-round operations of the respective facilities, which are established with maximum power consumption calculated at the time of construction design.

Furthermore, amenities within the building constitute a system capable of conservation even if abnormal temperature, increase in occupancy load, and change in business category occur.

BRIEF DESCRIPTION OF DRAWINGS

FIG. 8 is a diagram describing calculation of load surplus for each month;

FIG. 9 is a diagram showing exemplary mean temperatures for calculating load surplus for each month;

FIG. 11 shows and exemplary program for reading out control patterns;

FIG. 12 shows an exemplary pattern for analog control;

FIG. 13 shows an exemplary program for analog control;

FIG. 14 shows exemplary preset temperatures;

FIGS. 17-1 is a graph showing the beginning part of the months of yearly weather transition data;

FIGS. 17-2 is a graph showing the middle part of the months of the yearly weather transition data; and FIGS. 17-3 is a graph showing the end part of the months of the yearly weather transition data.

BEST MODE FOR CARRYING OUT THE INVENTION

An embodiment of the present invention is described forthwith while referring to the appended drawings.

An energy management system of the present invention is a system which controls energy considerably by controlling each device within electrical facilities and mechanical facilities, so as to eliminate excess of air conditioners and related devices and then conducting year-round necessary and optimum operations of the respective facilities, which are established with maximum power consumption calculated at the time of construction design. In addition, amenities within the building constitute a system capable of conservation even if abnormal temperature, increase in occupancy load, and change in business category occur.

According to the energy management system of the present invention, conditions of operations and control of the respective equipment may be monitored in real time using a personal computer at a job site, a client's head office, a management company, or the like by connecting to the client's head office and the management company by predetermined lines. Furthermore, layout change and increase in prepared numerical control data due to weather or reasons of the client, which are external factors, may be changed in accordance therewith using the personal computer via the line.

Moreover, in the unlikely event that the computer system has a failure, the equipment in the facilities may operate with power flowing through the respective facilities in real time via a preset bypass, thereby maintaining the amenities of the building.

Note that energy-saving target facilities of the computer system described forthwith are as follow.

Electrical facilities (power distributing system, electric light/power facilities)

Mechanical facilities (ventilators, air conditioners, plumbing sanitary facilities)

Figure 1:
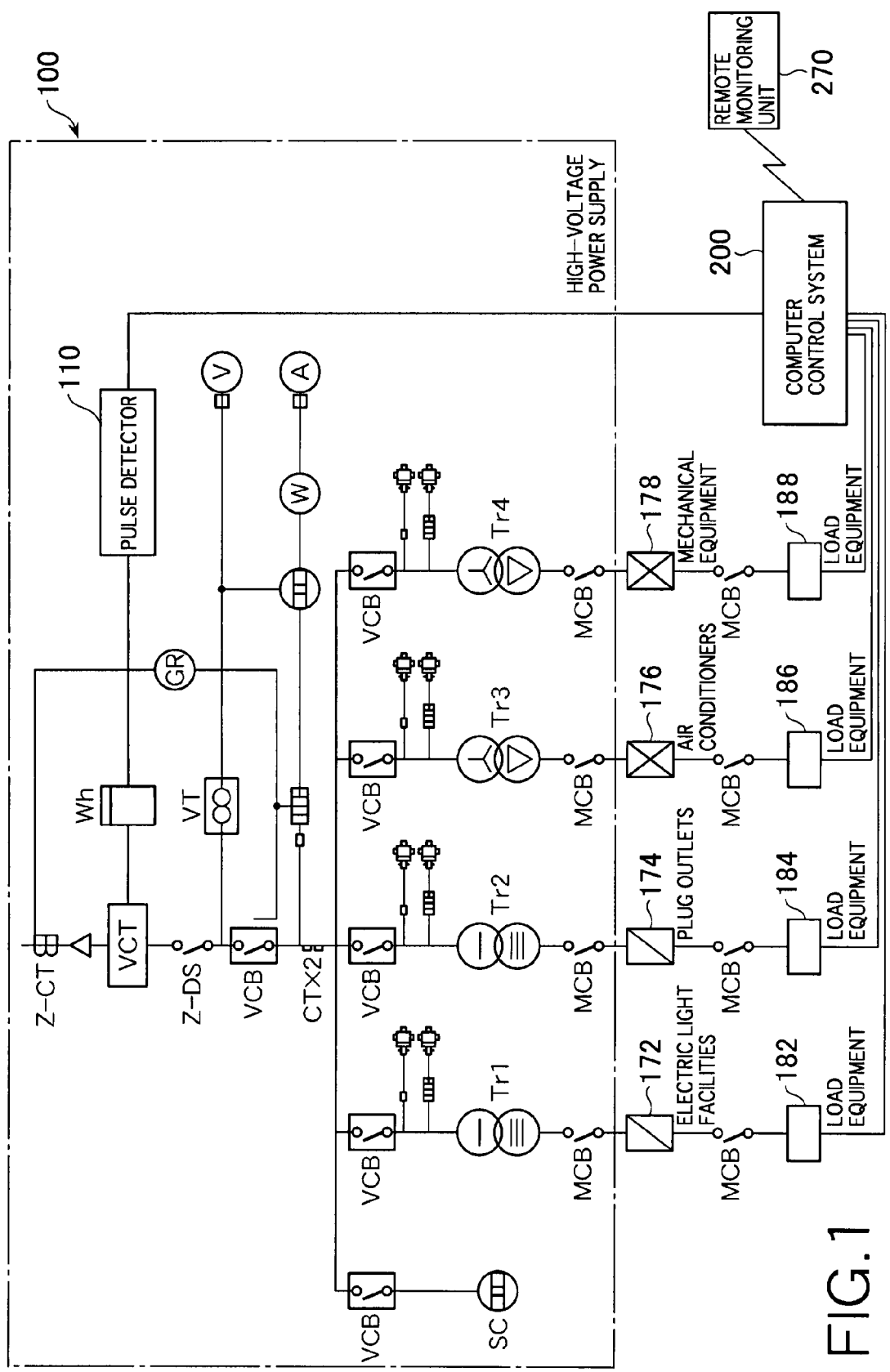
FIG. 1 is a diagram showing a structure of an entire energy management system of the present invention.

FIG. 1 shows a structure of the entire energy management system of the present invention.

A pulse detector 110, which is installed in a high-voltage power reception facility 100, is connected to an integrating wattmeter VCT of an electric power company and is also connected to a computer control system 200.

Power is supplied to respective pieces of load equipment 182, 184, 186, and 188 via a disconnecting switch Z-DS, a high-voltage vacuum circuit breaker VCB, transformers Tr1, Tr2, Tr3, and Tr4, circuit breakers MCB of the high-voltage power reception facility 100, distribution boards 172, 174, 176, and 178, and circuit breakers MCB. The computer control system 200 is also connected to the respective load equipment 182, 184, 186, and 188, and performs digital or analog control and monitoring of the load equipment depending on the type of load equipment. The load equipment includes electric light facilities, plug outlets, air conditioners, and mechanical facilities.

Figure 2:
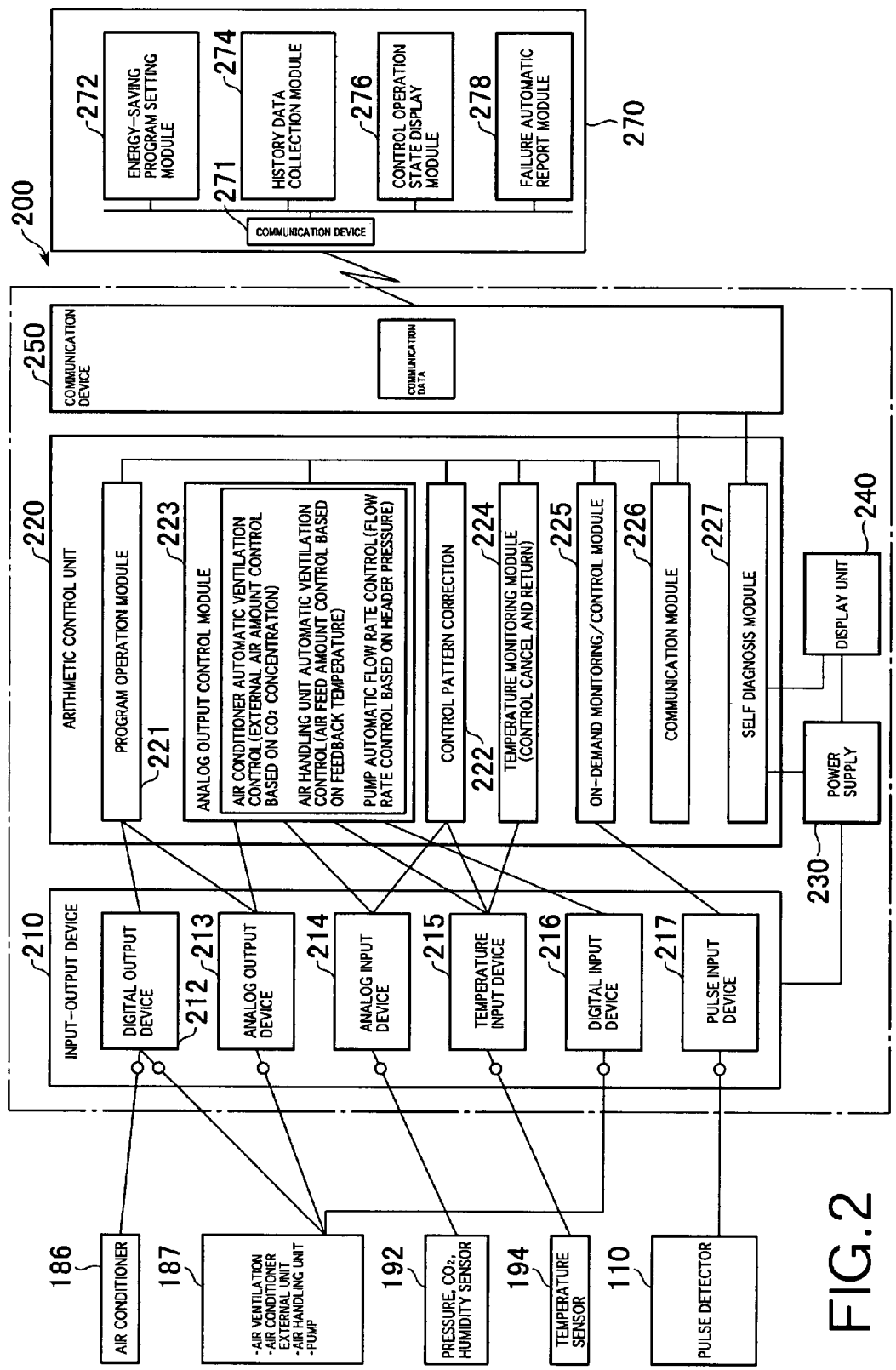
FIG. 2 is a diagram showing functions of a computer control system.

FIG. 2 shows a structure of the computer control system 200. This computer control system 200 is provided within an energy-saving target building.

In FIG. 2, an arithmetic control unit 220 is a processing unit for executing control/monitor programs and monitoring and controlling the entire computer control system. A program operation module 221, an analog output control module 223, a temperature monitoring module 224, a demand monitoring/control module 225, a communication module 226, and a self diagnosis module 227, which are respectively modules of monitoring/control performed through execution of the control/monitor program by the arithmetic control unit 220, are described later in detail.

A communication device 250 connects the computer control system 200 and a remote monitoring unit 270 via a line in the control of the communication module 226. An input-output device 210 is an interface for an air conditioner 186, an air conditioner external unit 187 and related devices, sensors such as a pressure/$CO_2$ sensor 192 and a temperature sensor 194, a pulse detector 110, and related devices. The interface includes a digital output unit (DO) 212 for outputting digital data, an analog output unit (AO) 213 for outputting analog data, an analog input unit (AI) 214 for inputting analog data, a temperature input unit (TI) 215 for inputting temperatures, a digital input unit (DI) 216 for inputting digital data, and a pulse input unit (PI) 217 for inputting pulses according to respective connected targets.

A display unit (touch panel) 240 is a device which displays controlled operating states of energy-saving target devices and may input data since it is also a touch panel. Furthermore, failure of the respective devices is detected, and a warning is generated notified by a lamp-buzzer on a control panel surface. A power supply 230 supplies power to all of the devices.

The remote monitoring unit (installed at a remotely supervised location) 270 relays information via the computer control system 200 and the communication unit 271, and is capable of controlling an energy-saving target device, monitoring operating state thereof, and accessing daily and monthly report data. Furthermore, transmission of various types of control information to the energy-saving target device allows updating of the control information remotely. Therefore, an energy-saving program setting module 272, a history data collection module 274, a control operation state display module 276, and a failure automatic report module 278, which are implemented using computer programs, are included. The remote monitoring unit 270 may have the same configuration as a typical personal computer.

(Modules of Arithmetic Control Unit 220)

The arithmetic control unit 220 achieves the respective modules by executing computer programs. The respective modules are explained in detail forthwith.

(Program Operation Module 221)

The program operation module 221 is divided into digital control (operate/stop) (see FIG. 3) and analog control (revolution speed control) (see FIG. 4) to be described in detail using flowcharts given in FIGS. 3 and 4, and is controlled by the computer control system 200 in accordance with the control programs as follows.

1) A control program (control month, time, and control pattern) is input by the energy-saving program setting module 272 from the remote monitoring unit 270 using prepared numerical control data. This control program will be described in detail later.

2) Operate/stop signals for the control month, time and control pattern analyzed for every control target device of the load equipment are output as operate (relay contact 'close')/stop (relay contact 'open') signals to the digital output unit 212.

3) The digital output unit 212 that has received the signals transmits the operate (relay contact 'close')/stop (relay contact 'open') signals to the air conditioner 186 or a relay drive unit (omitted from the drawing) for the air conditioner external unit 187 or related devices, which are controlled by exciting (relay contact 'close') or disconnecting (relay contact 'open') a relay unit.

4) The air conditioner 186 determines the signal exciting the relay unit (relay contact 'close') to mean operate, entering an operating state. Furthermore, when the signal disconnecting (relay contact 'open') the relay unit stops, the air conditioner enters a stopped state, thereby controlling operating and stopping automatically.

5) In the case of revolution speed control for the air conditioner external unit, air handling device, or related device 187, an analyzed revolution speed control value is transmitted to the analog output control module 223, the evolution speed control value is converted to an analog value of 4 to 20 mA via the analog output unit 213 and output to an inverter via a terminal block unit, controlling the revolution speed.

Figure 3:
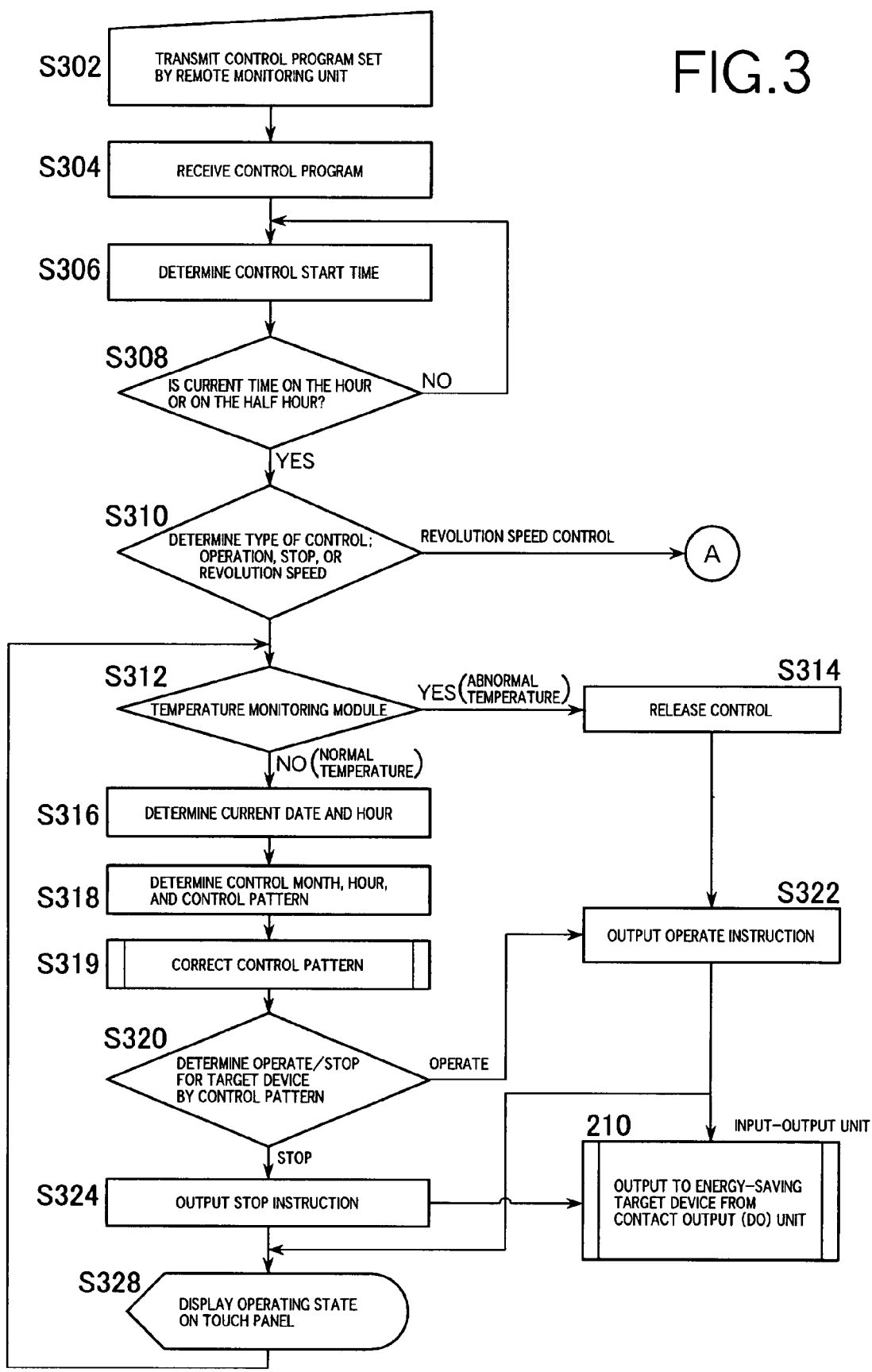
FIG. 3 is a diagram showing a digital control processing flow.

Program control processing is described forthwith using the flowchart of FIG. 3. When the input control program is transmitted by the remote monitoring unit 270 (S302) and received by the computer control system 200 (S304), it is then stored in a storage area of memory of the arithmetic control unit 220. With the control program stored in the storage area, an operation (on)/stop (off)/revolution speed according to control month, time, and control pattern is output to every control target device of the load equipment.

Latest sent control program data is updated on every hour and half hour (S306, S308) and control is then carried out accordingly. This is because the power demand means average power over a predetermined period, and generally, this 'predetermined period' is specified as thirty minutes long in electricity supply stipulations. In addition, the maximum value of power demand during a period of one month is called maximum demand. Program control is also performed in sync with the on-demand control every hour and half hour.

Figure 4:
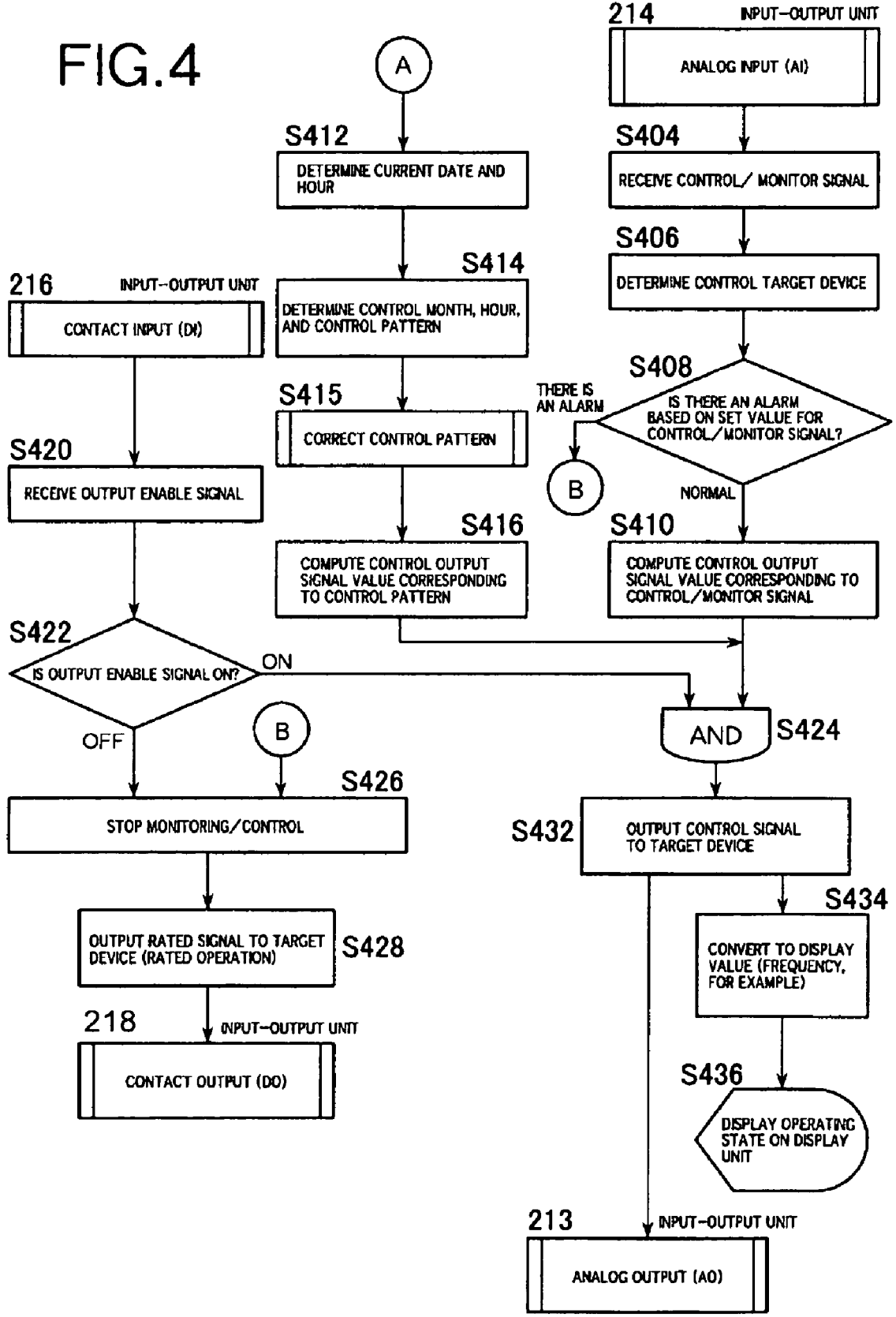
FIG. 4 is a diagram showing an analog control processing flow.

Next, the type of control to be performed is determined (S310), proceeding to the control specified in the flowchart of FIG. 4 for the case of analog control such as revolution speed control, for example. The program control for analog control is described in the subsequent analog control section.

In the case of digital control, when an abnormality in temperature deviating from a preset temperature is detected (YES in S312), program control is cancelled (S314), and a signal indicating that the control target device is forced into an operating state is output (S322). Temperature monitoring is described in detail later using the flow in FIG. 5.

In the case of program control, current date and time are acquired (S316), and a control pattern for that time is obtained from a control program (S318) so as to judge whether operation of the target device is turned ON or OFF (S320) and whether to output an operation instruction (S322) or a stop instruction (S324). A control signal is then output from the digital output unit 212 to the control target device. The target device temporarily stops operation (turns OFF) according to the pattern specified in the program control. The control program displaying the current operating state on the display unit 240 and the remote monitoring unit 270 (S328) is described in detail later.

(Analog Output Control Module 223)

Analog control is performed by the energy-saving program setting module 272 of the remote monitoring unit, which inputs control setting data (i.e., association between the control target devices and the monitoring unit (sensor), maximum/minimum setting values for the monitoring unit, output range for an inverter, target demand value, and the like), according to the prepared numerical control data. The analog output control module 223 sets for every control target device of the load equipment, maximum/minimum setting values for the monitoring unit and output range for the inverter. If they deviate from the setting values for the monitoring unit, rated operation is performed.

Association between control and signals from pressure and temperature sensors is described in further detail.

A control/monitoring pressure value and a temperature value detected by a pressure sensor 194 and a temperature sensor 194 are converted to electronic analog signals, and transmitted to the analog input unit 214 and the temperature input unit 215. The received analog signal values are then transmitted to the analog output control module 223 of the arithmetic control unit 220. The analog output control module 223 converts values from the pressure sensor and the temperature sensor to control signals, and controls the control target device 187 using inverter control output signals from the analog output unit 213 and the digital output unit 212.

The target device changes the frequency for the control target devices, such as an air conditioner external unit, an air handling device, and a pump, based on the analog signal values of the received inverter control output signals, and performs automated airflow control for the air conditioner, semi-automated airflow control, and automated flow control for the pump.

In the case of performing rated operation, an inverter rated operation signal is transmitted to the control target device 187 from the digital output unit 212. Once the control target device 187 receives the inverter rated operation signal, revolution speed control based on analog output control stops, and rated operation is restored at a rated value (e.g., 47 Hz) set to the inverter.

Flow of analog control is described forthwith while referring to FIG. 4.

When an analog signal is input and received as a control/monitor signal from the analog input unit (AI) 214 (S404), it is corresponded to the control target device (S406). If the control/monitor signal deviates from the setting value, a warning is issued (S408). For example, when the maximum temperature of a certain room is set to 29 degrees Celsius and when it exceeds 29 degrees Celsius, analog control is stopped (S426) and a rated signal is output to the target device (S428). The target device receives the rated signal from a contact output terminal 218 of the input-output device and then starts rated operation.

Note that the control target device may output an output enable signal as an interlock signal issued from a switch (contact). The switch value is received from the digital input unit 216 (S420), and in the case where the switch is OFF (S422), rated operation is performed (S428) without analog control. In the case where the output enable signal indicates ON, analog control is performed (S424).

Analog control is performed by calculating a control output signal value in accordance with the control/monitor signal when it falls within the setting values for the monitor signal (S410). This is typical analog control.

When the aforementioned output enable signal indicates ON, the calculated control signal is output to the analog output unit (AO) 213 of the input-output device so as to be output to the target device.

This value is converted to an indicated value (S434) and displayed on the display unit (S436).

Even during analog control, program control is performed by the device. It is represented by processing which starts at A continuing from FIG. 3. This processing determines the current date and time (S412) and also determines a control pattern according thereto (S414). A control output signal value is then calculated according to the control pattern (S416). This is performed by controlling an air conditioner fan, for example. Subsequent control is as described above.

(Temperature Monitoring Module 224)

The temperature monitoring module of FIG. 3 will be described with FIG. 5. The temperature monitoring module cancels program control or on-demand control (control of maximum energy) when the temperature exceeds a preset temperature.

Figure 5:
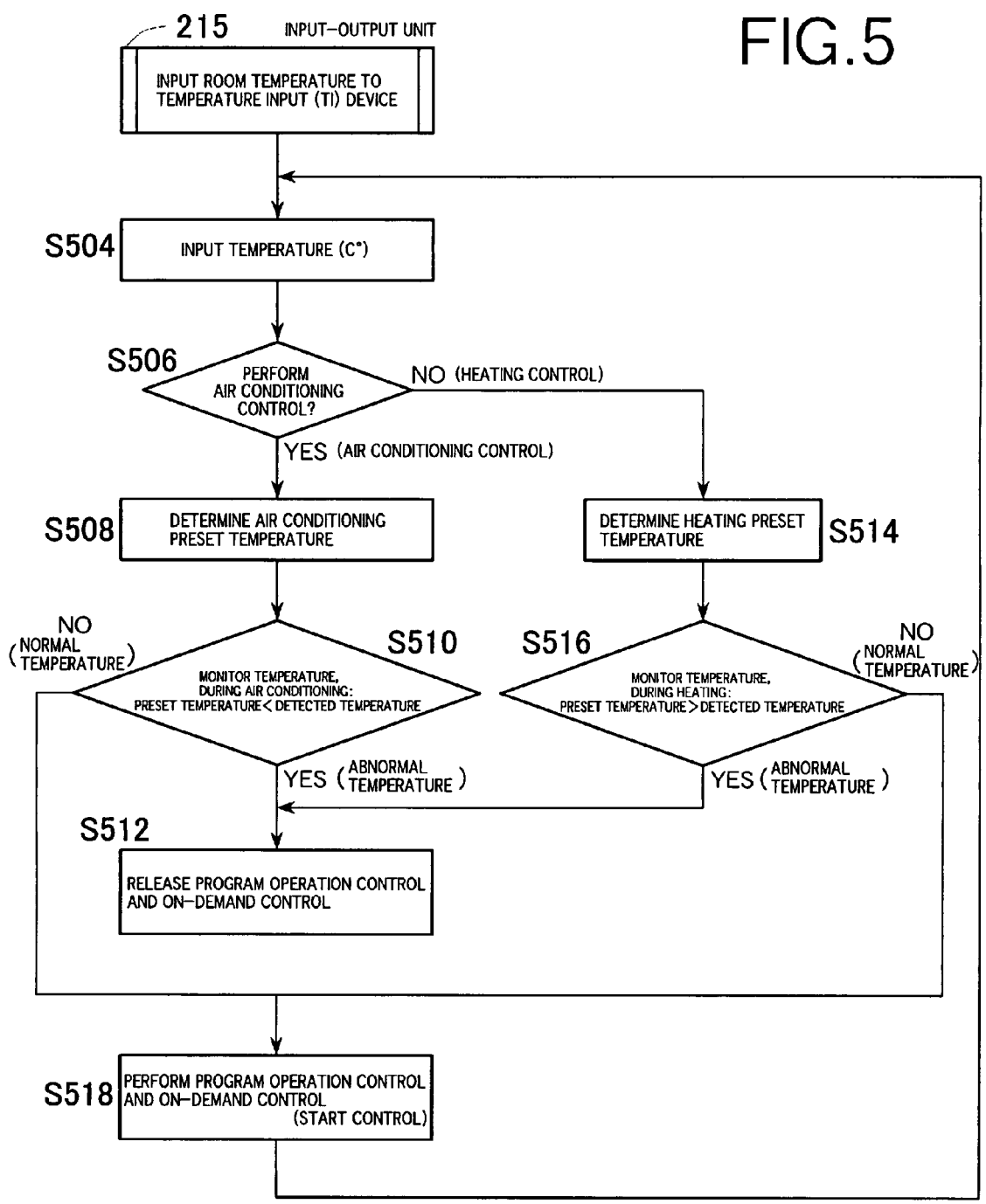
FIG. 5 is a diagram showing a temperature monitoring/control processing flow.

In the flowchart of FIG. 5, room temperature from the temperatures input unit 215 is input (S504), whether operating mode is either air-conditioning control or heating control (S506), and preset temperatures for those modes are determined (S508, S514). In the temperature monitor operation (S510, S516), the temperatures determined for the respective air-conditioning control and heating control are compared to the detected room temperature to examine whether it is an abnormal temperature (S510, S516). When it is abnormal (YES in S510 and S516), program operation control and on-demand control are cancelled (S512). When it is a normal temperature, program operation control and on-demand control are performed (S518). In the case where program operation control and on-demand control have already been cancelled, program operation control and on-demand control are resumed.

(Demand Monitoring/Control Module 225)

Demand monitoring/control is control for supplying power within an established maximum supply power through contract with a power company. This control is described using a flowchart of FIG. 6.

Figure 6:
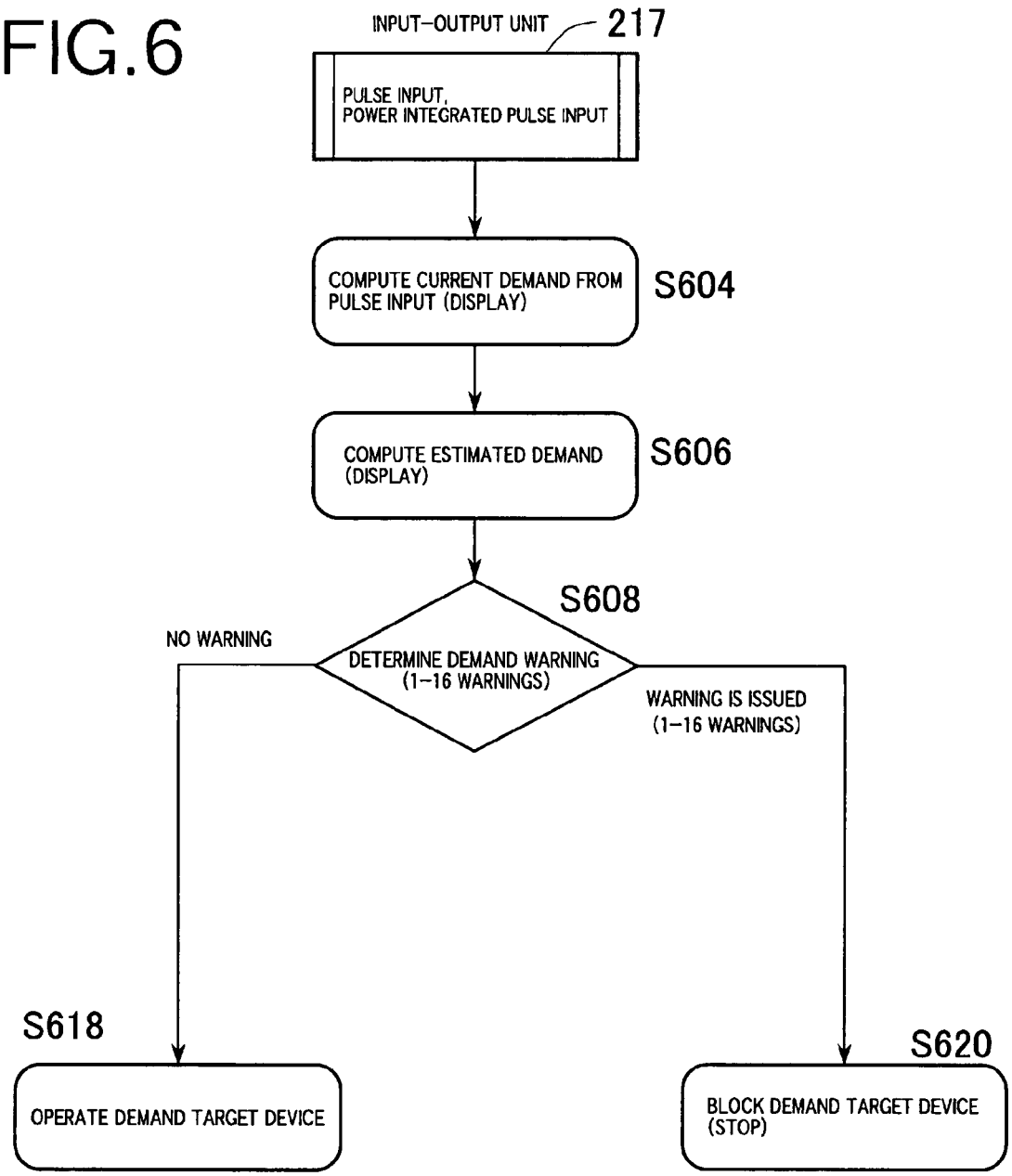
FIG. 6 is a diagram showing a demand estimation processing flow.

In FIG. 6, a pulse detected by the pulse detector 110, which is attached to a wattmeter Wh of FIG. 1, enters the arithmetic control unit 220 via the pulse input unit 217 of the input-output device 210 (S604) so as to calculate the current demand value based on a pulse input accumulated value and display that value on the display unit (S606). A predicted demand value is calculated from this value by the following equation (S608).

[Equation 1]

$$\text{Predicted demand value} = \text{Current demand value} \times \Delta t / \Delta P \times (30 - t)$$

where $\Delta t / \Delta P$ denotes predicted coefficient, $(30-t)$ denotes remaining time within 30 minutes after an elapsed time, $\Delta t$ denotes monitoring time interval (e.g., 10 seconds), and $\Delta P$ denotes variation in power during the monitoring time intervals.

When this predicted demand value exceeds a preset target demand value, a 16-level warning is generated (S608), and, a stop signal is issued to 'demand block target devices' (S620) set to scheduled operations, (S618) which are then successively controlled, according to the 16-level warning.

(Communication Module 226)

In this system, the remote monitoring unit 270 may collect and display monitoring/control history data and operation control state of the computer control system 200.

This is performed by transmitting respective request signals to the computer control system 200 from the remote monitoring unit 270 via the communication devices 271 and 250.

The computer control system 200 may determine that the received request signals are history data request signals, return the history data (power usage summary data for the maximum 24 months, event history summary data, and the like) stored in the system to the remote monitoring unit 270, and display and print them out.

The computer control system 200 is capable of recognizing information by transmitting 'demand monitor data', 'scheduled operating state data', 'inverter operating state data', and 'monitored temperature/setting value data' stored in the system to the remote monitoring unit 270 in 3 second cycles, for example, when the received request signals are judged to be operation control display request signals.

Furthermore, a pattern for program control may be created and changed by the remote monitoring unit 270.

(Self Diagnosis Module 227)

Whether there is a failure of the computer itself is determined by the computer control system 200 capable of self diagnosis.

When a failure is detected through the self diagnosis (CPU failure, input-output device failure), the name of the failure device and an error code are stored, that data is automatically transmitted to the remote monitoring unit 270, control is automatically cancelled, and the respective control load equipment perform rated operation to maintain the amenities of the building.

When 'CPU error' or 'power supply error' is detected upon detection of a failure through self diagnosis, a 'CPU error' lamp on the control board of the computer control system is turned on and an error buzzer is sounded.

The aforementioned self diagnosis may detect a failure signal thereof and report it to the remote monitoring unit 270 upon occurrence of a failure of equipment.

A failure of equipment is reported in the following manner. A contact signal output at the time of a failure of equipment is detected by the digital input unit 216, failure equipment name is determined by the arithmetic control unit 220, and that failure equipment name is notified to the remote monitoring unit 270 from the communication device 250. The remote monitoring unit 270 is capable of notifying the failure of the equipment by displaying the reported failure equipment name using the control operation state display module 276.

<Program Control>

Program control of the present invention is described in detail using FIGS. 7 through 14.

Figure 7:
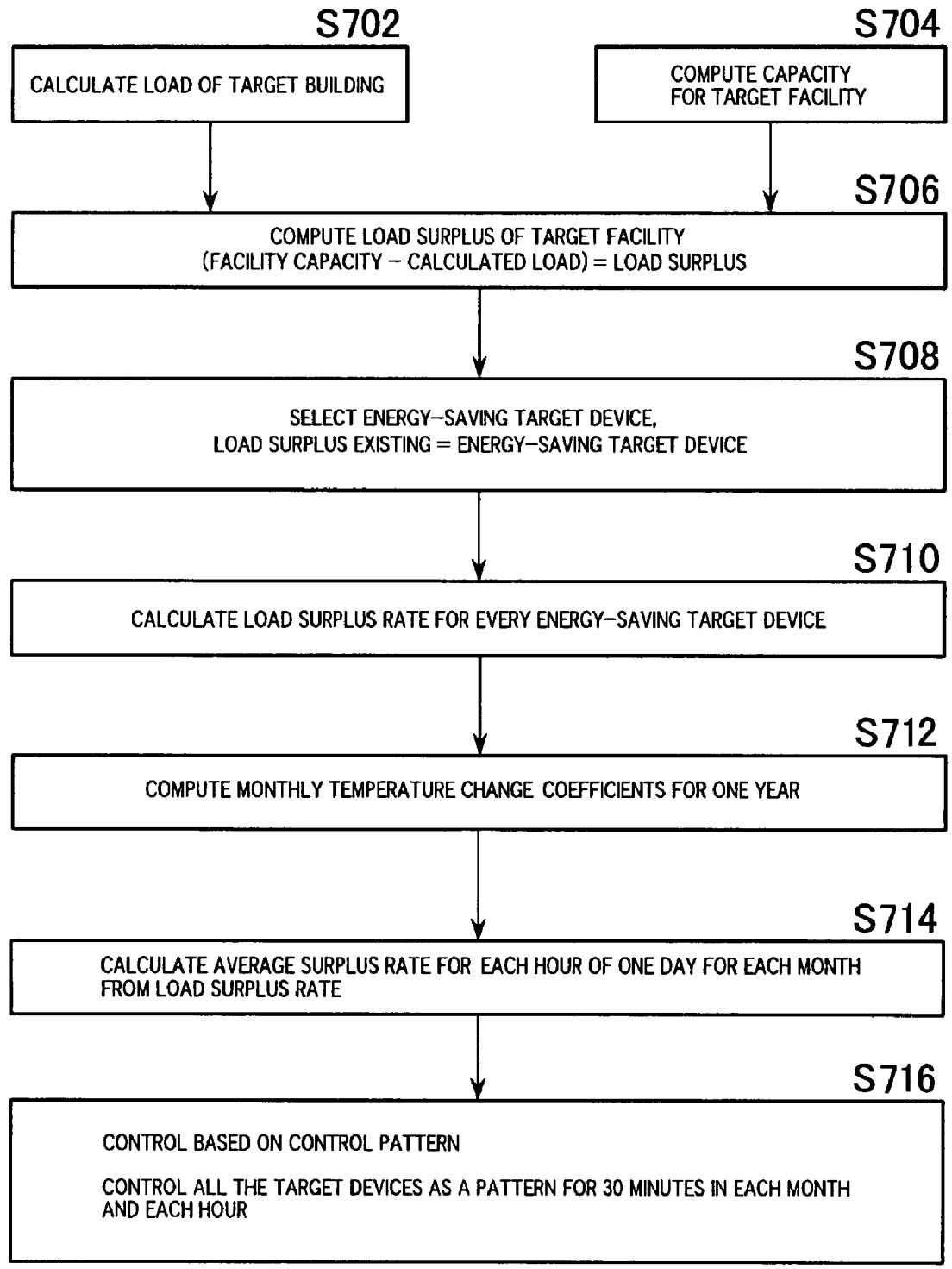
FIG. 7 is a diagram showing a procedure of calculating load surplus.

Normally, program control is based only on on-demand control. However, according to this program control, an operation control program for air conditioners and ventilators is generated, so to perform meticulous control to prevent the air conditioners and ventilators from operating excessively through accurate calculation of load on the building, and thereby controlling the air conditioners and ventilators according to that program. FIG. 7 is a flowchart for generating a program for such program control.

In FIG. 7, first, load and ventilation of the target building are calculated (S702).

(1) Computation of installed capacity of the building is specified by composition, capacity, and classification of electrical facility and mechanical facility according to internal and external parameters such as usage, module, size, and location.

(2) Energy levels consumed by the building are determined at times of maximum capacity and maximum operation during use of both the electrical facilities and the mechanical facilities. Furthermore, maximum energy levels appear in mid-winter and mid-summer in terms of climate phenomena, and daytime and midnight in terms of time.

(3) Load of ventilators depends on human population in the building, where surplus is calculated through estimation of actual usage.

This load calculation may be carried out through the calculation method described in 'Maximum Heat Load Calculation Method for Designing' (issued by Maruzen, December, 1989) The Society of Heating, Air-conditioning and Sanitary Engineers of Japan, for example. Capacities of the air conditioners and ventilators provided in the target building are also calculated (S704).

Note that as to the capacities of the electrical facilities and mechanical facilities at the time of construction, a maximum load is set by totaling an expected maximum energy level consumed by the building and expected values due to aged deterioration and layout alterations.

Necessary heat/ventilation load and capacities of the air conditioners and ventilators provided through these calculations may be compared to one another to grasp the difference thereof as surplus load (S706). This allows the computer control system 200 to select energy-saving target devices to be subjected to control for energy conservation (S708). Since the aforementioned load of the building is calculated for each room and floor controlled by the same ventilator, energy-saving target devices may be selected based on this calculation. Next, load surplus rate is calculated for every energy-saving target device (S710). Monthly temperature change coefficients for a year are calculated based on recent average monthly temperatures of that area (S712). Load surplus rate per day and hour for each month is calculated based on the temperature change coefficients (S714). And then the computer controls all the target devices base on the controlled pattern (S716).

Method of calculation in each stage of FIG. 7 is described in detail using FIGS. 8 and 9. FIG. 8(a) shows load surplus rate calculated for a predetermined number of air conditioners by comparison between calculated load of the building and the capacity of the air conditioners. First, capacities for air conditioning and heating are given as 'installed capacity'. What are written as 'air conditioning load' and 'heating load' indicate results from calculating loads of the building. Since maximum loads are calculated, load for August is calculated for 'air conditioning load' and load for January is calculated for 'heating load'. 'Air conditioning load' is calculated at 9:00, 12:00, 14:00, and 16:00. Differences between the 'installed capacity' for air conditioning and heating and 'air conditioning load' and between the 'installed capacity' and 'heating load' are 'surplus loads', respectively. This difference is then divided by the 'installed capacity' to calculate 'surplus rate'. For the 'air conditioning load', 'average load' is calculated by taking the average of the surplus rates.

For ventilation surplus, estimation of the human population in the building for actual maximum use allows calculation of maximum 'surplus rate' due to the necessity of taking in air.

'Monthly air-conditioning operation coefficient' for each month is described forthwith using FIG. 9. FIG. 9 shows average temperatures at every set hour for July and August as examples. First, each average temperature between 9:00 and 16:00 is calculated as 'hourly average temperature 1', each average of temperature at the other hours is calculated as 'hourly average temperature 2', and these two average temperatures are added and then divided by two to give '24-hour average temperature'. For the period (April through November) when air conditioning, ratio to the '24-hour average temperature' for August is calculated as 'temperature change coefficient' (0.87 in July). This 'temperature change coefficient' is calculated for each month and then multiplied by the August operating rate (1-surplus rate=1−0.18=0.82) to calculate 'monthly air-conditioning service factor' for each month. In the case of July, it may be calculated by {August operating rate (0.82)}×{July temperature change coefficient (0.87)}={July monthly air-conditioning service factor (0.71)}.

The surplus rate for each set hour of each month in FIG. 8(b) is calculated based on the 'monthly air-conditioning service factors' given in FIG. 9. In the case of air conditioning, calculation is made using an expression (August 'monthly air-conditioning service factor')×(August 'monthly air-conditioning service factor'/'monthly air-conditioning service factor' for each month).

While a surplus rate is calculated for heating (December through April) based on January in the same manner as for air conditioning, it is calculated so that the surplus rate decreases as temperature rises, which is different from the case of air conditioning.

Figure 10:
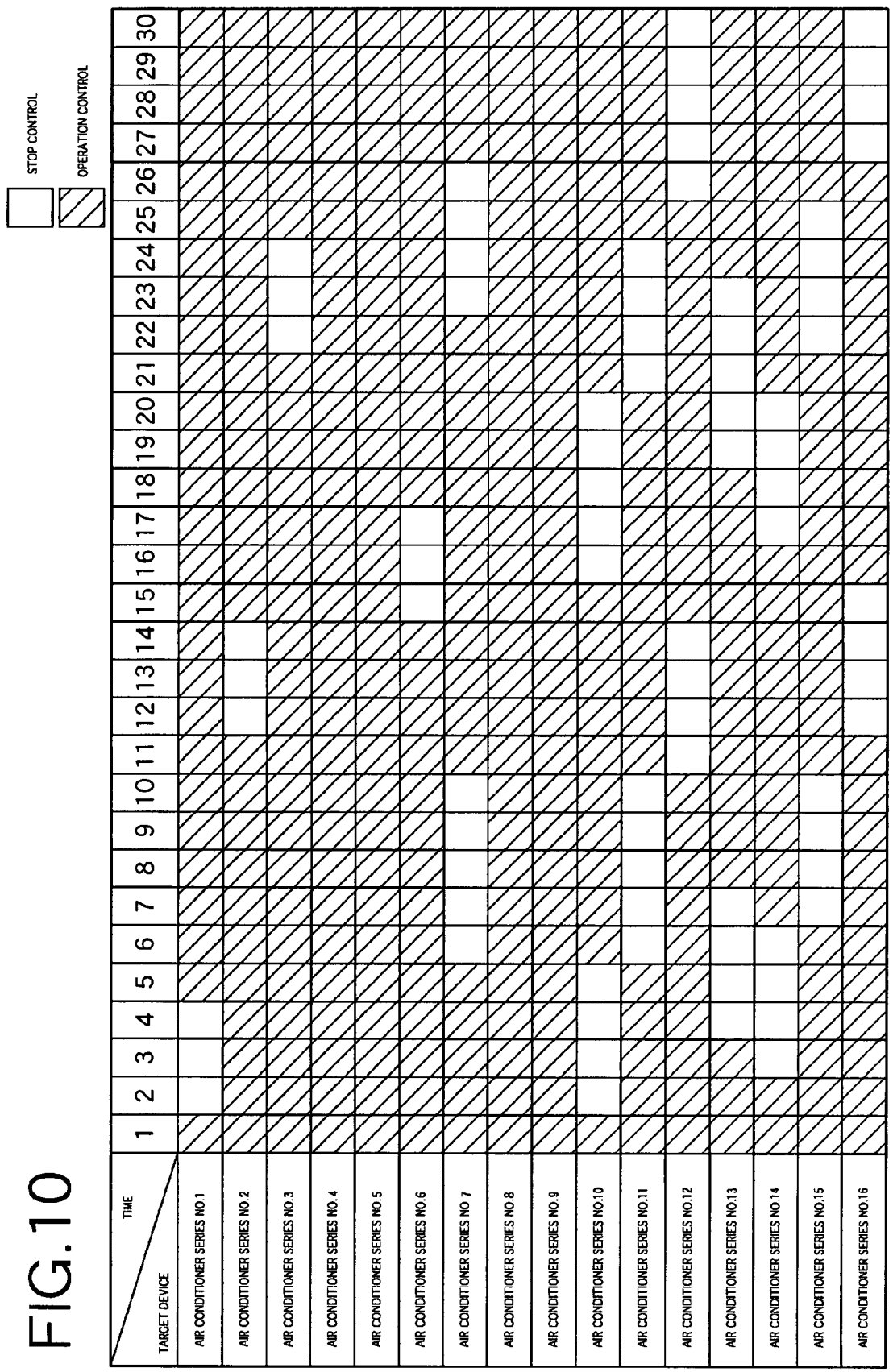
FIG. 10 is a diagram showing on/off control patterns in certain units of control.

The operating rate is (1-surplus rate) and is the basis for generating the control program. Exemplary digital control programs are shown in FIGS. 10 and 11. FIG. 10 shows an exemplary control pattern with which thirty minute periods of stopping and operating for each series (16 series) of air conditioners, which is a unit of control, are controlled every minute. In the case where there are multiple series as in FIG. 10, it is preferable to control the respective series to stop operation at different times in units of control allowing an operating rate of 29/30 or 97% when stopping for one minute after thirty minutes of operation and an operating rate of 90% when stopping for three minutes after thirty minutes of operation as with No. 1 of FIG. 10. This causes peak power to be lower and prevents multiple currents, which trigger the motor and the like to start operation, from flowing at the same time. This control pattern is given a number, and multiple control patterns may be stored in memory of the computer control system 200, specified by number and read out. This is described using FIG. 11.

FIG. 11 shows a control program specifying a control pattern to be read out every thirty minutes. Such a control program may be stored in the memory of the computer control system 200 to specify in detail a control pattern for control according to the current time.

Analog control may be performed on the basis of program control as well. The analog control on the basis of program control is described using FIGS. 12 and 13.

The analog control based on program control is not on the binary control basis as stop and operate, but is on the basis of ratio to the maximum output (rated power) of every thirty minutes as with a control pattern given in FIG. 12. Even with analog control on the basis of program control, multiple control patterns are given numbers, stored in the memory of the computer control system 200, and may be specified by number and read out.

Reading out by number is set for each device, as shown in an example for an exhaust fan (ventilator) of FIG. 13. Control patterns are specified by number for the respective devices for each month and are stored as a yearly schedule in the memory of the computer control system 200.

FIG. 14 shows preset temperatures for scheduled demand of the temperature monitoring module described with FIG. 5. Preset maximum temperatures during air conditioning and minimum temperatures during heating are given in this manner. This may be set for each air conditioner system.

(Control Pattern Correction Module 222)

Figure 15:
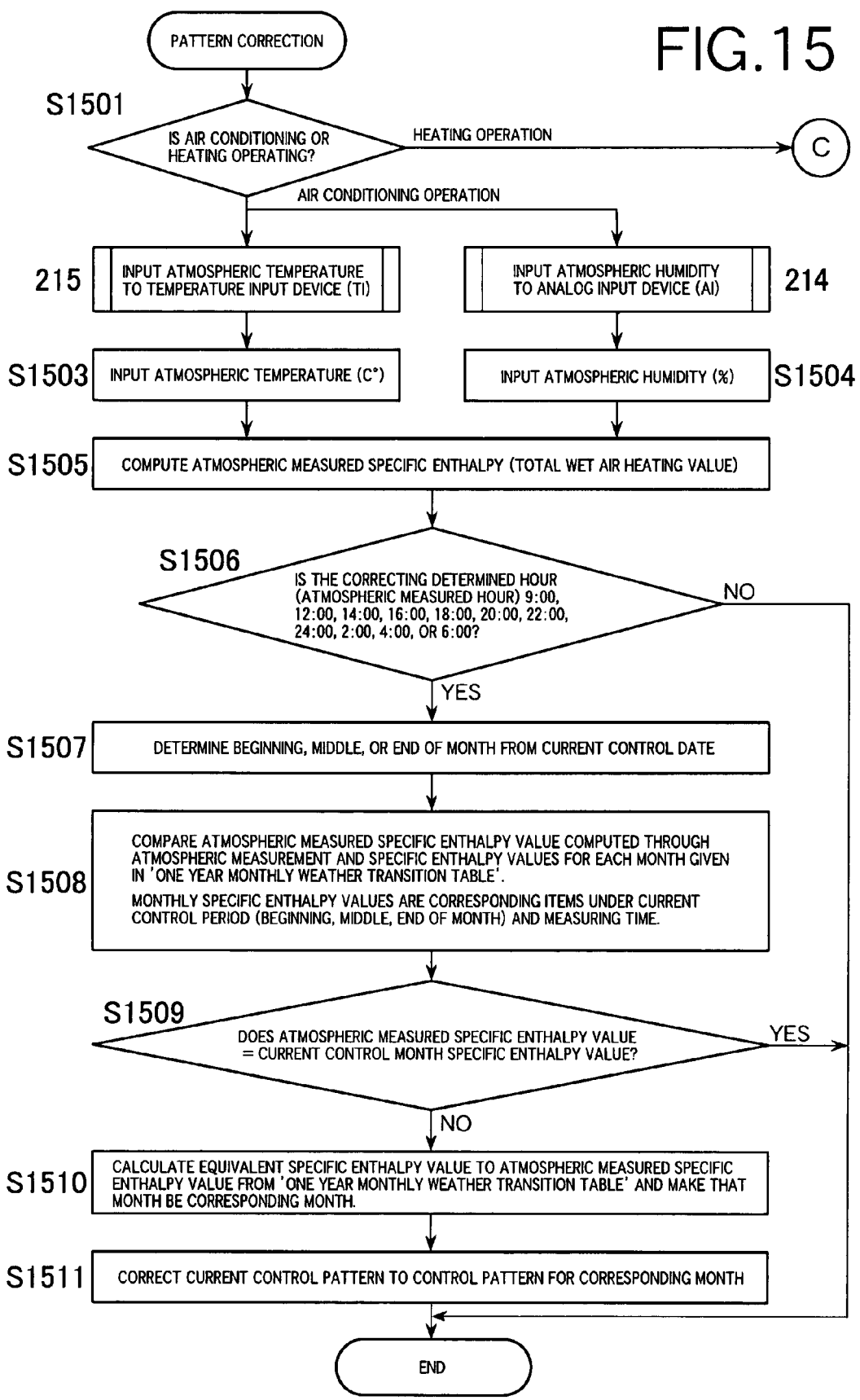
FIG. 15 is a diagram showing a correction flow for air conditioning.
Figure 16:
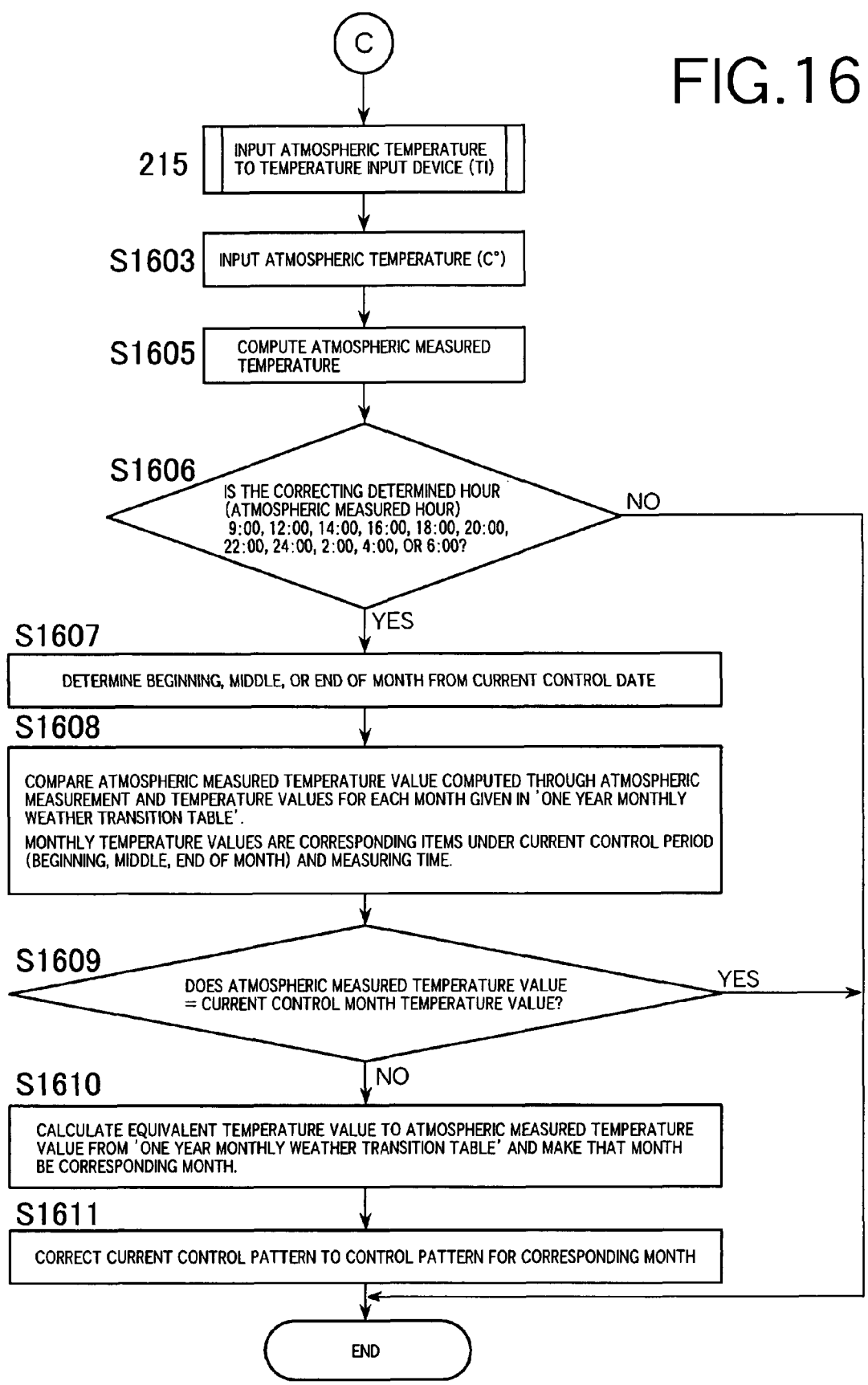
FIG. 16 is a diagram showing a correction flow for heating.

The control pattern correction module 222 (namely step S319 of FIG. 3 and step S415 of FIG. 4) is described using FIGS. 17-1, 17-2, 17-3, and flowcharts of FIGS. 15 and 16.

With the control program shown in the flowcharts of FIGS. 3 and 4, a control pattern at the current date and time is obtained (S318, S414), and then whether the obtained control pattern is an optimal pattern for the current weather conditions is determined. If the temperature and humidity are different from the control pattern, the control pattern is corrected. This is called pattern correction function.

First, in FIG. 15, the flow for this correction determines whether the control target device is air-conditioning or heating (S1501). This flow then branches in two correction flows: one for the control target device air-conditioning (FIG. 15) and the other for the control target device heating (FIG. 16). In the case of air conditioning in FIG. 15, atmospheric temperature detected by an atmospheric temperature sensor 192 is input to the arithmetic control unit 220 from a temperature input unit 215 (S1503) while atmospheric humidity is input from an analog input unit 214 (S1504). Specific enthalpy or total wet air heating value is computed based on the input temperature and humidity by the arithmetic unit (S1505). The computed specific enthalpy value and specific enthalpy values given in yearly weather transition data (stored; see FIGS. 17-1 (beginning), FIGS. 17-2 (middle), FIGS. 17-3 (end)) for each month, period (beginning, middle, and end of the months) and hour (9:00, 12:00, 14:00, 16:00, 18:00, 20:00, 22:00, 24:00, 2:00, 4:00, 6:00) provided using a predetermined control program are compared. Afterward, finding which month's specific enthalpy value given in the yearly weather transition data corresponds to the computed current specific enthalpy value is performed, and the optimal control pattern is then determined. For example, a case where the control pattern of 9:00 on June 1 is determined is described forthwith.

First, a correcting hour is determined (S1506). Eleven hours: 9:00, 12:00, 14:00, 16:00, 18:00, 20:00, 22:00, 24:00, 2:00, 4:00 and 6:00 are given. These coincide with load calculation times when generating a pattern for the aforementioned program control. When the hour does not coincide, control using the current control pattern continues without carrying out pattern correction. Since this measuring time is 9:00 and coincides therewith, processing proceeds to a pattern correction determination routine, and measurement day is determined to fall within a range from the date June 1 to the beginning period of the subsequent month (S1507). In the case where the atmospheric specific enthalpy calculated based on the temperature and humidity at 9:00 on June 1 is 69.81 (kj/kgDA), for example, correspondence to the specific enthalpy for August is understood from the item under beginning/9:00 (see FIGS. 17-1) of the yearly weather transition data of FIGS. 17-1, 17-2 and, 17-3 (S1508, S1510). In this case, it is determined to be the weather conditions for August regardless of July, the control pattern for August is input to the control program, and the control pattern is corrected so as to perform control (S1511).

In the case where the aforementioned atmospheric specific enthalpy 69.81 (kj/kgDA) corresponds to the specific enthalpy for June, control using the current control pattern continues without carrying out pattern correction (S1509).

Next, a pattern correction flow during heating is described using FIG. 16. During heating, atmospheric temperature detected by the atmospheric temperature sensor is input to the arithmetic control unit 220 from the temperature input unit 215 (S1603). The input temperature and temperatures given in the yearly weather transition data (FIGS. 17-1 (beginning), FIGS. 17-2 (middle), FIGS. 17-3 (end)) for each month, period (beginning, middle, and end of the months) and hour (9:00, 12:00, 14:00, 16:00, 18:00, 20:00, 22:00, 24:00, 2:00, 4:00, 6:00) are compared, finding which month's temperature given in the yearly weather transition data corresponds to the computed current temperature is performed (S1605, S1606), and the optimal control pattern is then determined (S1607, S1608). If the determined corresponding month is the same as the current control month, control using the current pattern continues without carrying out pattern correction (S1609). Otherwise, if the corresponding month differs from the current control month, the control pattern for the corresponding month is input to the control program, and the control pattern is corrected so as to perform control (S1610, S1611).

The invention claimed is:

1. An energy management system for managing consumed energy of a control target device including air conditioners in a building, said energy management system comprising:

a pattern storage means, which stores a plurality of on and off patterns every predetermined unit of time;

an analog pattern storage means, which stores a plurality of rates for every respective predetermined unit of time during rated operation;

a program storage means, which stores programs for a year each predefined for each month or for each month and hour so as to reduce surplus load for every predetermined time;

a digital control means, which reads out a program from the program storage means, reads out from the pattern storage means, an on and off pattern for the current month and hour specified by a preset program, and turns the control target device on and off for every predetermined unit of time;

an analog control means, which reads out a program from the program storage means, reads out from the analog pattern storage means, a current month and hour operating ratio specified by the program, and controls an output rate for the control target device every predetermined time during rated operation, so as to reduce surplus load for every respective predetermined time, and a temperature monitoring means, which monitors a preset temperature, and stops control performed according to the program when a temperature that exceeds or falls below the preset temperature is detected.

2. The energy management system of claim 1, wherein the pattern stored in the pattern storage means includes predetermined off times for respective units of control over the control target device differing from one another.

3. The energy management system of claims 1, further comprising:

a demand estimation means, which receives a signal indicating used power of the building and estimates used power for every predetermined time; and a demand warning generation means, which receives the demand estimation and then generates a warning.

4. The energy management system of claim 1, further comprising:

a temperature/humidity measuring means, which measures atmospheric temperature and humidity;

a specific enthalpy calculation means, which calculates specific enthalpy based on the atmospheric temperature and humidity from the temperature/humidity measuring means; and a correction means, which compares the calculated specific enthalpy and specific enthalpy for preset months and times when air conditioning, so as to correct the program more appropriately.

5. The energy management system of claim 4, wherein the correction means compares the temperature measured by the temperature/humidity measuring means and preset monthly and hourly temperatures when heating so as to correct the program more appropriately.

* * * * *